(12) United States Patent
Brady

(10) Patent No.: US 9,393,603 B2
(45) Date of Patent: Jul. 19, 2016

(54) UNIFORM VAPOR PATHWAYS FOR SOIL EVAPORATIVE DESORPTION

(71) Applicant: RETERRO, INC., Pleasanton, CA (US)

(72) Inventor: Patrick Richard Brady, Sisters, OR (US)

(73) Assignee: RETERRO INC., Livermore, CA (US)

( * ) Notice: Subject to any disclaimer, the term of this patent is extended or adjusted under 35 U.S.C. 154(b) by 0 days.

(21) Appl. No.: 14/488,317

(22) Filed: Sep. 17, 2014

(65) Prior Publication Data

US 2015/0078829 A1 Mar. 19, 2015

Related U.S. Application Data

(63) Continuation-in-part of application No. 13/419,195, filed on Mar. 13, 2012.

(60) Provisional application No. 62/048,794, filed on Sep. 10, 2014, provisional application No. 61/878,617, filed on Sep. 17, 2013, provisional application No. 61/878,618, filed on Sep. 17, 2013, provisional application No. 61/878,619, filed on Sep. 17, 2013, provisional application No. 61/878,624, filed on Sep. 17, 2013.

(51) Int. Cl.
*B09C 1/06* (2006.01)
*B09C 1/00* (2006.01)

(52) U.S. Cl.
CPC .. *B09C 1/005* (2013.01); *B09C 1/06* (2013.01)

(58) Field of Classification Search
USPC ................................ 405/128.85, 128.8, 128.7
See application file for complete search history.

(56) References Cited

U.S. PATENT DOCUMENTS

| 4,140,478 | A | * | 2/1979 | Kawakami | C01B 31/00 202/136 |
|---|---|---|---|---|---|
| 5,088,856 | A | * | 2/1992 | Yocum | F26B 11/0413 110/246 |
| 5,242,245 | A | * | 9/1993 | Schellstede | B09C 1/06 110/346 |
| 6,840,712 | B2 | * | 1/2005 | Satchwell | B09B 3/00 37/351 |
| 2008/0069640 | A1 | * | 3/2008 | Haemers | B09C 1/06 405/128.85 |
| 2014/0363234 | A1 | * | 12/2014 | Hamilton | B09C 1/06 405/128.85 |

* cited by examiner

*Primary Examiner* — Benjamin Fiorello
*Assistant Examiner* — Kyle Armstrong

(57) ABSTRACT

Disclosed is a method and a system of uniform vapor pathways for soil evaporative desorption. In one embodiment, a batch of contaminated soil is placed inside a treatment compartment through a hopper. The contaminated soil is moved across an inner length of the treatment compartment. As the contaminated soil moves toward a far end of the treatment compartment, planes surrounding the contaminated soil vibrates to facilitate mixing and loosening of the contaminated soil, thereby creating uniform vapor pathways around the surface and within the contaminated soil. A plurality of helical stem auger comprising helical flights may rotate to further mix and loosen the contaminated soil. Heat is applied to the contaminated soil to desorb contaminates within the soil. A vapor extraction line within a core of the hollow stem auger suctions vaporized contaminates out of the treatment compartment and into a reclamation system.

7 Claims, 23 Drawing Sheets

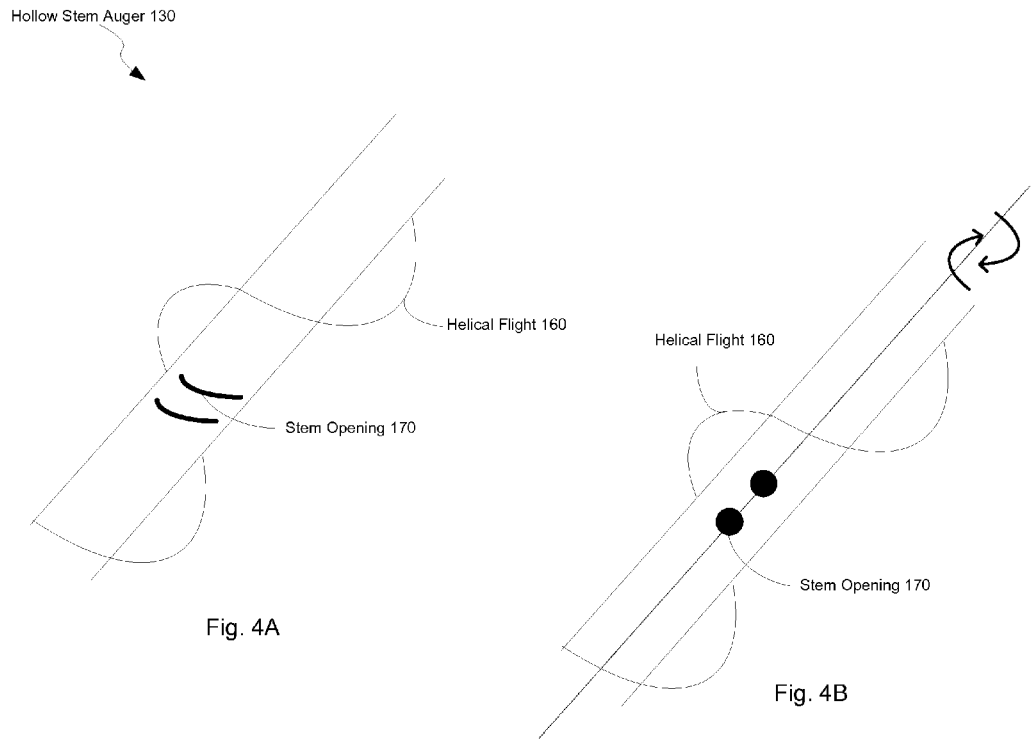
Fig. 4A
Fig. 4B
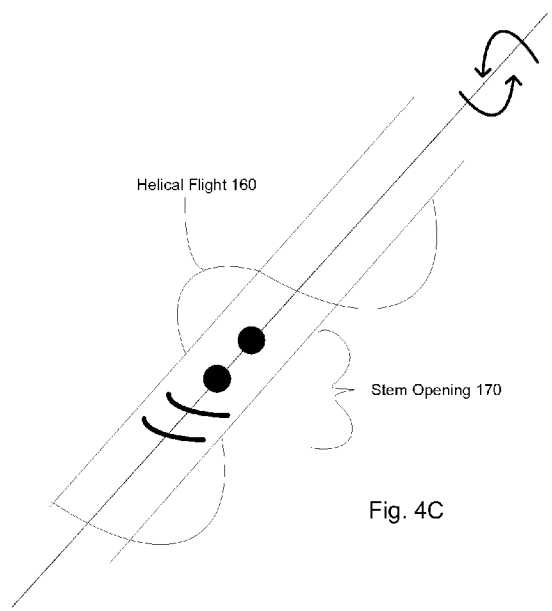
Fig. 4C

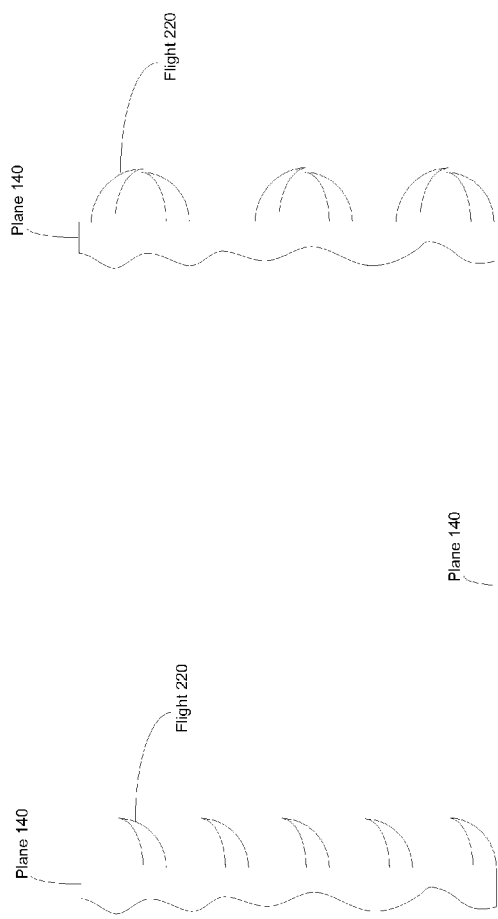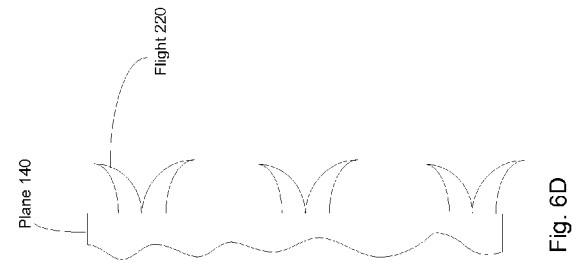

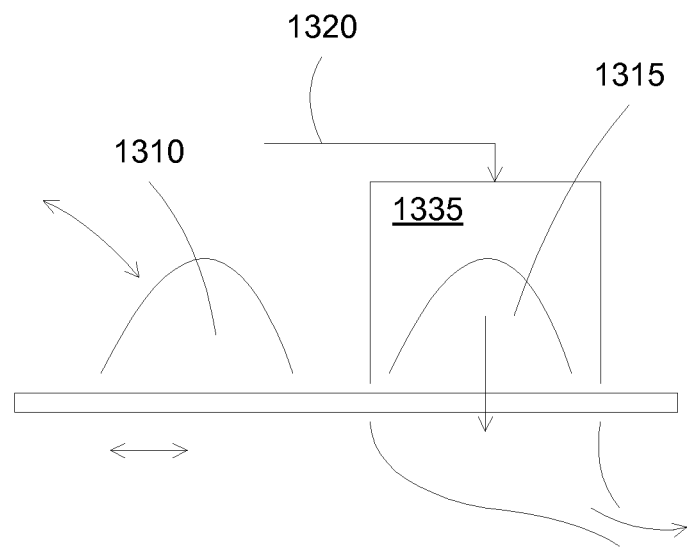
Fig. 13A
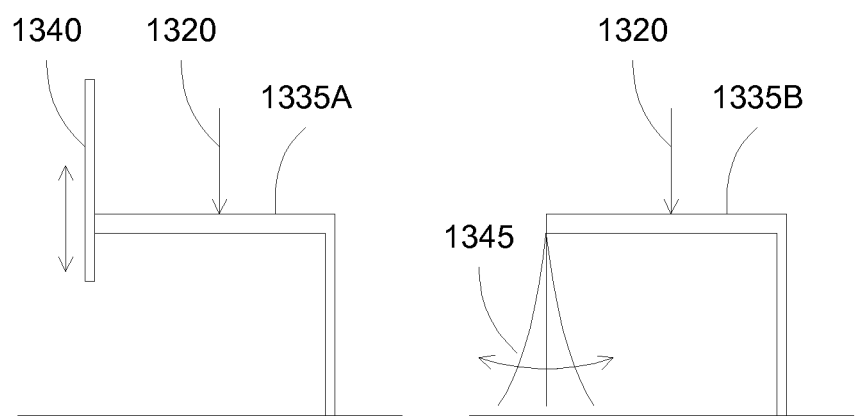
Fig. 13B
Fig. 13C

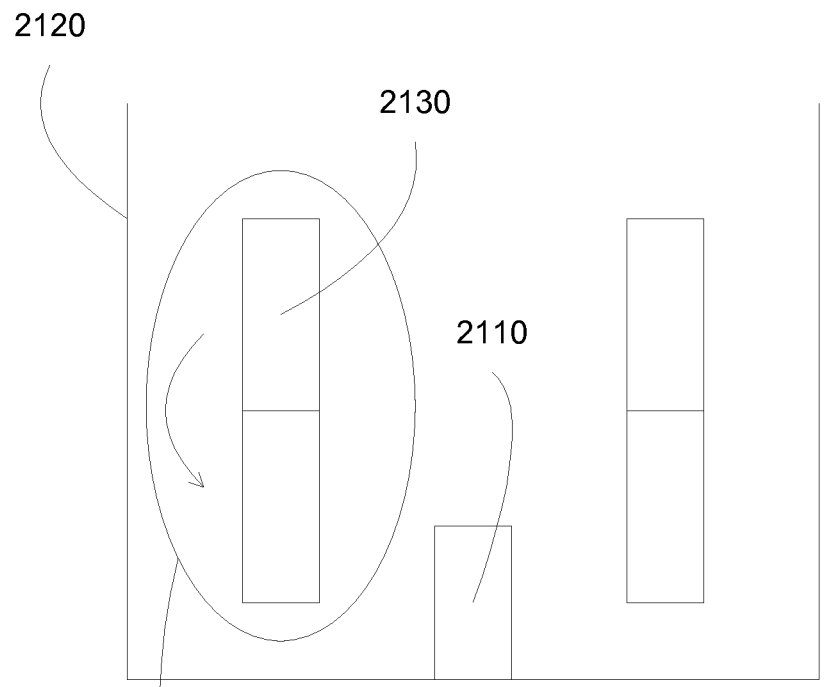
Fig. 14
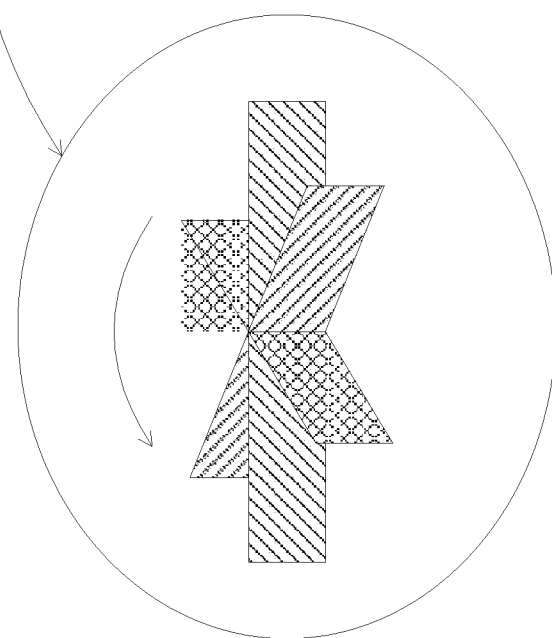

ent application is a continuation-in-part and claims
UNIFORM VAPOR PATHWAYS FOR SOIL EVAPORATIVE DESORPTION

CLAIMS OF PRIORITY

This patent application is a continuation-in-part and claims priority from:
(1) U.S. provisional patent application No. 62/048,794, filed on Sep. 10, 2014, entitled "Feedback loop control for soil evaporative desorption", which is incorporated herein by reference.
(2) U.S. provisional patent application No. 61/878,617, filed on Sep. 17, 2013, entitled "Conveyor belt systems for soil treatment", which is incorporated herein by reference.
(3) U.S. provisional patent application No. 61/878,618, filed on Sep. 17, 2013, entitled "Agitation system for thermal desorption process", which is incorporated herein by reference.
(4) U.S. provisional patent application No. 61/878,619, filed on Sep. 17, 2013, entitled "Sun heating system for thermal desorption processes", which is incorporated herein by reference.
(5) U.S. provisional patent application No. 61/878,624, filed on Sep. 17, 2013, entitled "Additives for thermal desorption processes", which is incorporated herein by reference.
(6) U.S. utility patent application Ser. No. 13/419,195, filed on Mar. 3, 2012, entitled "Evaporative desorption high concentration soil contaminate removal and contaminate reclamation apparatus and process", which is incorporated herein by reference.

FIELD OF TECHNOLOGY

This disclosure relates generally to contaminated soil reclamation and/or remediation and, more particularly, to a method, a system and/or an apparatus of uniform vapor pathways for soil evaporative desorption.

BACKGROUND

The use of petroleum hydrocarbons as a fuel source is ubiquitous in society. Consequently, petroleum hydrocarbon products are stored and handled in great quantities. One risk associated with the storage and handling of petroleum hydrocarbons is the potential for spillages during handling or the potential for leakage during storage. Due to the negative environmental impact associated with spills and leakages of petroleum hydrocarbons, rules have been established at the local, state and federal levels. These rules primarily focus on preventing petroleum hydrocarbon releases to the environment from occurring. These rules also have provisions that require the responsible party to remediate petroleum hydrocarbon releases to the environment.

In the field of petroleum hydrocarbon remediation from soil, there are two basic approaches: applying a treatment technique to soil in place (in-situ), or applying a treatment technique to excavated soil (ex-situ). There are advantages and disadvantages for each approach and the selection of the approach is based on the site-specific circumstances of each petroleum hydrocarbon release.

In-situ thermal desorption technologies can include techniques that involve applying heat and vacuum simultaneously to subsurface soils to vaporize volatile contaminates in the soil. Processes of vaporizing of contaminates can include evaporation into the subsurface air stream, steam distillation into the water vapor stream, boiling, oxidation, and/or pyrolysis. The vaporized water, contaminants, and organic compounds are drawn by the vacuum in a counter-current direction to the flow of heat into the source of vacuum.

Ex-situ thermal desorption technologies can include techniques that involve mechanical agitation of the soil during the heating process, which involve mechanical agitation and operate in a continuous process where the soil is continuously introduced to the process and is mechanically moved through the process apparatus until treatment is complete, and then is continuously discharged to a container for disposal or re-use.

Alternately, the soil can be treated in a static configuration of an ex-situ thermal desorption system, in which a given amount of soil is introduced to the treatment chamber. The soil configurations can include pile arrangement and container arrangements.

Nearly all the prior art processes use combustion of fossil fuel as a heat source. This can have the consequence of forming products of incomplete combustion, oxides of nitrogen, and other greenhouse gases as a by-product. Combustion also has the potential to add unburned hydrocarbons to the process exhaust gas if strict control of the combustion process is not maintained.

There is a need for an ex-situ static process that is labor, time and energy efficient in the treatment process, and is environmentally friendly.

SUMMARY

Disclosed are a method and a system of uniform vapor pathways for soil evaporative desorption.

In one or more embodiment, the invention relates to a process and apparatus for non-combustive thermal desorption of volatile contaminates from contaminated earth. The earth may include tar sand, oil sand, oil shale, bitumen, pond sediment, and tank bottom sediment. The process can provide cracking of the contaminates, and/or reclaiming condensable contaminates, then oxidizing and treating the non-condensable reclamation effluent, which can be recycled for use as the thermal desorption treatment gas.

In one or more embodiment, a soil evaporative desorption process is disclosed. A treatment process comprise dumping a batch of contaminated soil into a treatment compartment through a hopper of the treatment compartment. The treatment compartment may be heat insulated to minimize or eliminate heat loss to the environment. The contaminated soil may move across an inner length of the treatment compartment. As the contaminated soil is being moved from one end of the treatment compartment to another end of the treatment compartment, a plurality of planes surrounding the contaminated soil may vibrate to facilitate mixing and loosening of the contaminated soil, thereby creating uniform vapor pathways around the surface and within the contaminated soil. A plurality of hollow stem auger comprising a plurality of helical flights may rotate to further facilitate mixing and loosening contaminated soil.

One or more heat line may be configured to delivery heat to the contaminated soil within the treatment compartment. The heat emanating from the one or more heat line may desorb the contaminates from the contaminated soil in the thermal evaporative desorption process. Vaporized volatile hydrocarbon contaminates may be suctioned out of the treatment compartment through a plurality of openings positioned in between the plurality of helical flights. The plurality of openings may be coupled to a conduit that may expel post-treatment gas out of the treatment compartment and into a reclamation system. The reclamation system may condense condensable hydrocarbon contaminates. Clean soil resulting from treatment may be disposed out of the treatment compartment at a far end of the treatment compartment.

In one or more embodiment, systems and methods to treat contaminated soil are provided, including a conveyor treatment system with ease of operation and improved decontamination efficiency and throughput. A conveyor system can provide continuous operations, e.g., treating the soil which is continuously provided at one end of the conveyor belt. A conveyor system can provide batch operations, e.g., treating the soil in batches. Preheating chamber and post-treatment chamber can be used, in addition to treatment chambers, for better operation.

In one or more embodiment, systems and methods to treat contaminated soil are provided, including an agitation system for stirring the soil during the thermal desorption process. The agitation system can improve decontamination efficiency and throughput. An agitation system can include a stirrer in a soil box, moving the soil within the soil box for better heat uniformity. An agitation system can include platform movements for stirring the soil.

In one or more embodiment, systems and methods to treat contaminated soil are provided, including a sun heating system for reduce the energy consumption. Solar power can be provided to a soil box, heating the soil. The solar power can be a main power source, or can be a supplemental power source for a hot gas system. In addition, an agitation system can be included to stir the soil for an even heating. Vaporized contamination can be exhausted at the soil bottom or from the soil top surface.

In one or more embodiment, systems and methods to treat contaminated soil are provided, including adding additives to improve a characteristic of the thermal desorption process, such as adding steam to improve thermal heat transfer, adding anhydrous chemical to absorb water moisture from the contaminated soil, or adding solvent to extract hydrocarbon based contaminants from the soil.

In one or more embodiment, water or steam can be added to the thermal desorption chamber. The steam can be used alone, e.g., using the high thermal energy stored in the steam to heat the soil. Water, such as hot water, can be used with hot gas, which then can be sprayed onto the soil. In addition, water vapor or steam can be delivered inside the soil box, wetting the soil.

In one or more embodiment, the soil can be configured to have a certain humidity level.

Thus dry soil can be treated with added water or steam to bring the humidity to an appropriate level for thermal desorption treatment.

Other additives can be used. For example, anhydrous chemicals, such as anhydrous ammonia, can be used to extract water moisture from the soil. In one or more embodiment, wet soil can be treated with anhydrous ammonia to reduce the humidity content. For example, anhydrous ammonia can be delivered to the thermal desorption chamber together with the hot gas. The anhydrous ammonia can absorb moisture from the soil, making the thermal desorption of the contaminated soil more effective.

In one or more embodiment, solvent can be added to the contaminated soil for extracting volatile contaminants. For example, alcohol, such as ethanol, can be provided to the soil contaminated with hydrocarbons, such as oil or petroleum. Low temperature solvent extraction process conditions can be established to remove hydrocarbons from the contaminated soil.

The method, system, and/or apparatus disclosed herein may be implemented in any means for achieving various aspects. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIGS. 4A-4C are views showing alternative configurations for an opening of the hollow stem auger, according to one or more embodiment.

FIGS. 6A-6D are views showing alternative configurations for the flight of the plane of FIG. 2, according to one or more embodiment.

FIGS. 13A-13C illustrate another batch conveyor system for thermally treating contaminated soil, according to one or more embodiment.

FIG. 14 illustrates an agitation system disposed in a soil box, according to one or more embodiment.

Other features of the present embodiments will be apparent from the accompanying drawings and from the detailed description that follows.

DETAILED DESCRIPTION

Disclosed are a method and a system of uniform vapor pathways for soil evaporative desorption. Although the present embodiments have been described with reference to specific example embodiments, it will be evident that various modifications and changes may be made to these embodiments without departing from the broader spirit and scope of the various embodiments. In addition, the components shown in the figures, their connections, couples, and relationships, and their functions, are meant to be exemplary only, and are not meant to limit the embodiments described herein.

Figure 1:
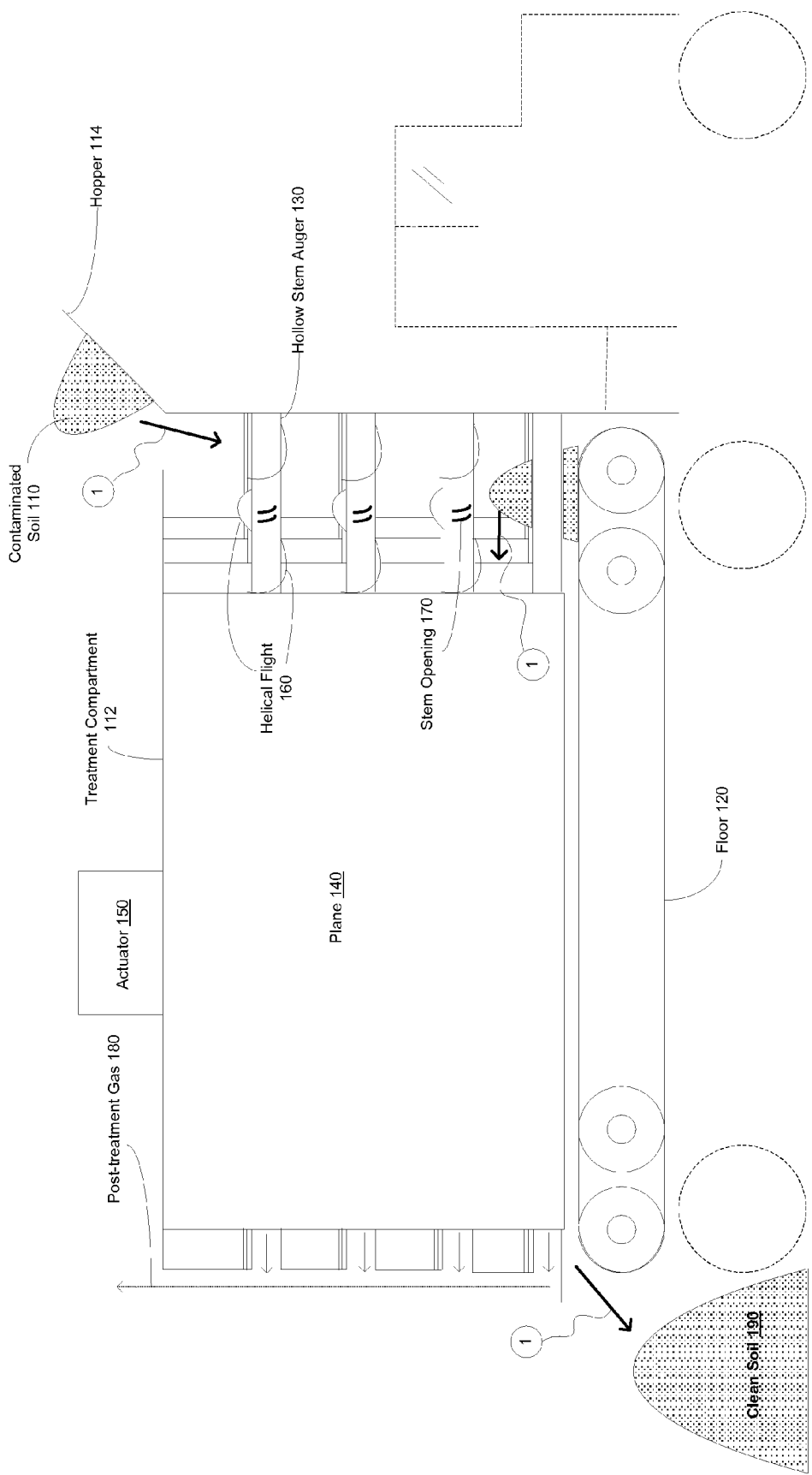
FIG. 1 is an overview of a configuration of a soil evaporative desorption system, according to one or more embodiment.

FIG. 1 is an overview of a configuration of a soil evaporative desorption system, according to one or more embodiment.

In particular, FIG. 1 describes a contaminated soil 110, a treatment compartment 112, a hopper 114, a floor 120, a hollow stem auger 130, a plane 140, an actuator 150, a helical flight 160, a stem opening 170, a post-treatment gas 180, and a clean soil 190.

In one or more embodiment, a system of uniform vapor pathways for soil evaporative desorption is disclosed. The contaminated soil 110 may be placed inside the treatment compartment 112 through the hopper 114. The treatment compartment 112 may be an enclosed space used to house a thermal desorption treatment of the contaminated soil 110, and may be a modified trailer. The treatment compartment 112 may be insulated from heat loss. The contaminated soil 110 may flow down onto the floor 120. The floor 120 may be a moving floor (e.g., a conveyor floor) arranged to transport the contaminated soil 110 inside the treatment compartment 112 and along its length. Circle '1' illustrates the path of the contaminated soil 110 through the treatment compartment 112.

During the time that the contaminated soil 110 traverses the inner length of the treatment compartment 112, a plurality of plane 140 may surround the contaminated soil 110 and may be coupled to the actuator 150 configured to vibrate the plane 140, thereby facilitate mixing of the contaminated soil 110. The vibration of the plurality of plane 140 may also facilitate loosening of the contaminated soil 110, thereby creating uniform vapor pathways around the surface and within the contaminated soil 110. The vapor pathways formed may allow for uniform heating of the contaminated soil 110 and uniform extraction of the resultant gas of the desorption process through the uniform vapor pathways, namely the post-treatment gas 180. Additionally, the formation of the uniform vapor pathways may increase surface-area-to-volume ratio of the contaminated soil 110, which may allow for more efficient heating of the contaminated soil 110.

The vibration of the plane 140 may be adjustable through an electronic controller, such as a programmable logic controller (PLC) communicatively coupled to the actuator 150. The vibration frequency may be adjusted to anywhere between 0 hertz (Hz) and 80 Hz, such as 40 Hz or 60 Hz. The range from 0 Hz to 80 Hz may be a desirable range because the contaminated soil 110 may be excavated from a dig site, in which the excavation process may already began loosening contaminated soil 110. A vibration frequency of above 80 Hz may not be necessary and may accelerate degradation of the treatment compartment 112 (e.g. the trailer unit). A higher vibration frequency of the plane 140 may be used on a batch of contaminated soil 110 that is desiccated and/or difficult to break apart. The higher vibration frequency of the plane 140 may also mixes and loosens the contaminated soil 110 faster, such as e.g., to be used with the treatment compartment 112 with a shorter inside length, which may afford shorter treatment time. A lower vibration frequency may be used with the treatment compartment 112 with a longer inner length.

In one or more embodiment, the floor 120 transporting the contaminated soil 110 across the inner length of the treatment compartment 112 may move in a forward direction from the right end of the treatment compartment 112 towards the left end of the treatment compartment 112. The floor 120 may also move a backward direction from the left end of the treatment compartment 112 towards the right end of the treatment compartment 112. The floor 120 may move in either of the two directions to facilitate treatment on the contaminated soil 110. For example, if a particular batch of contaminated soil 110 require additional treatment, then the floor 120 may move backwards to subject the contaminated soil 110 to more treatment. Additionally, the floor 120 may also stay stationary keep the contaminated soil 110 in the treatment compartment 112 indefinitely.

The inner length of the treatment compartment 112 may be between 8 feet (ft.) and 50 ft., such as e.g., 12 ft. or 20 ft. A longer treatment compartment 112 may be desirable for larger batches of contaminated soil 110 that may require longer treatment time to completely desorb contaminates. The longer treatment compartment 112 may also be desirable for contaminates that has a higher point of vaporization. The longer treatment compartment 112 may allow for higher temperature treatment because heat loss may not be as significant as for a shorter treatment compartment 112, which may have a larger surface-area-to-volume ratio.

In one or more embodiment, the speed of the floor 120 moving in the forward direction or the backward direction may be adjustable. The speed may be adjusted between 0 miles per hour (mph) and 7 mph, such as e.g., 0.5 mph or slower. A speed above 7 mph may not allow sufficient time for the contaminated soil 110 to completely desorb, depending on the inner length of the treatment compartment 112. The speed of the floor 120 of may be adjustable through an electronic controller, such as a programmable logic controller (PLC) communicatively coupled to a motor of the floor 120.

As the contaminated soil 110 moves across the inner length of the treatment compartment 112, one or more hollow stem auger 130 comprising helical flight 160 may rotate to mix the contaminated soil 110. The hollow stem auger 130 may be a steel rod. The helical flight 160 may be in direct contact with the contaminated soil 110. The rotation of the hollow stem auger 130 comprising helical flight 160 may also facilitate loosening of the contaminated soil 110, thereby creating uniform vapor pathways around the surface and within the contaminated soil 110. The vapor pathways formed may allow for uniform heating of the contaminated soil 110 and uniform extraction of the resultant gas of the desorption process through the uniform vapor pathways, namely the post-treatment gas 180. Additionally, the formation of the uniform vapor pathways may increase surface-area-to-volume ratio of the contaminated soil 110, which may allow for more efficient heating of the contaminated soil 110.

The rotation of the hollow stem auger 130 may be adjustable. The rotation may be adjusted between 0 revolutions per minute (rpm) and 120 rpm. A high rotation speed setting may be desirable for the batch of contaminated soil 110 that is desiccated and/or difficult to break apart. The higher rotation speed setting for the hollow stem auger 130 may also be used in the shorter treatment compartment 112 to sufficiently mix and loosen the contaminated soil 110 before it reaches a far end of the inner length of the treatment compartment 112. A lower rotation speed setting for the hollow stem auger 130 may be used in the longer treatment compartment 112 to more thoroughly mix and loosen the contaminated soil 110. In addition, the rotation of the hollow stem auger 130 may be adjusted to rotate in a clockwise direction or in a counter-clockwise direction. If more than one hollow stem auger 130 is used, each hollow stem auger 130 may be independently controlled to vary speed and/or direction of rotation. The speed and/or direction of rotation of the hollow stem auger 130 may be adjustable through an electronic controller, such as a programmable logic controller (PLC) communicatively coupled to a motor of the hollow stem auger 130.

In one or more embodiment, the contaminated soil 110 may be subjected to heat treatment within the treatment compartment 112. The heat treatment may desorb the contaminates from the contaminated soil 110. Vaporized contaminates may be vacuumed out of the treatment compartment 112 through the stem opening 170 of the hollow stem auger 130. The hollow stem auger 130 may comprise a hollow core to permit the intake of post-treatment gas 180 through the stem opening 170. Clean soil 190 may be disposed out of the treatment compartment 112 at the far end of the floor 120

After completion of treatment of a soil batch, post-treatment gas 180 may exit the treatment compartment 112 through a conduit coupled with the hollow stem auger 130. The post-treatment gas 185 may be further processed in a reclamation system that may comprise condensing condensable hydrocarbon contaminates extracted from the contaminated soil 110. The reclamation process may further comprise using non-condensed condensable hydrocarbon contaminates and/or non-condensable hydrocarbon contaminates to heat fresh air that may be supplied to the treatment compartment 112 as treatment gas.

Figure 2:
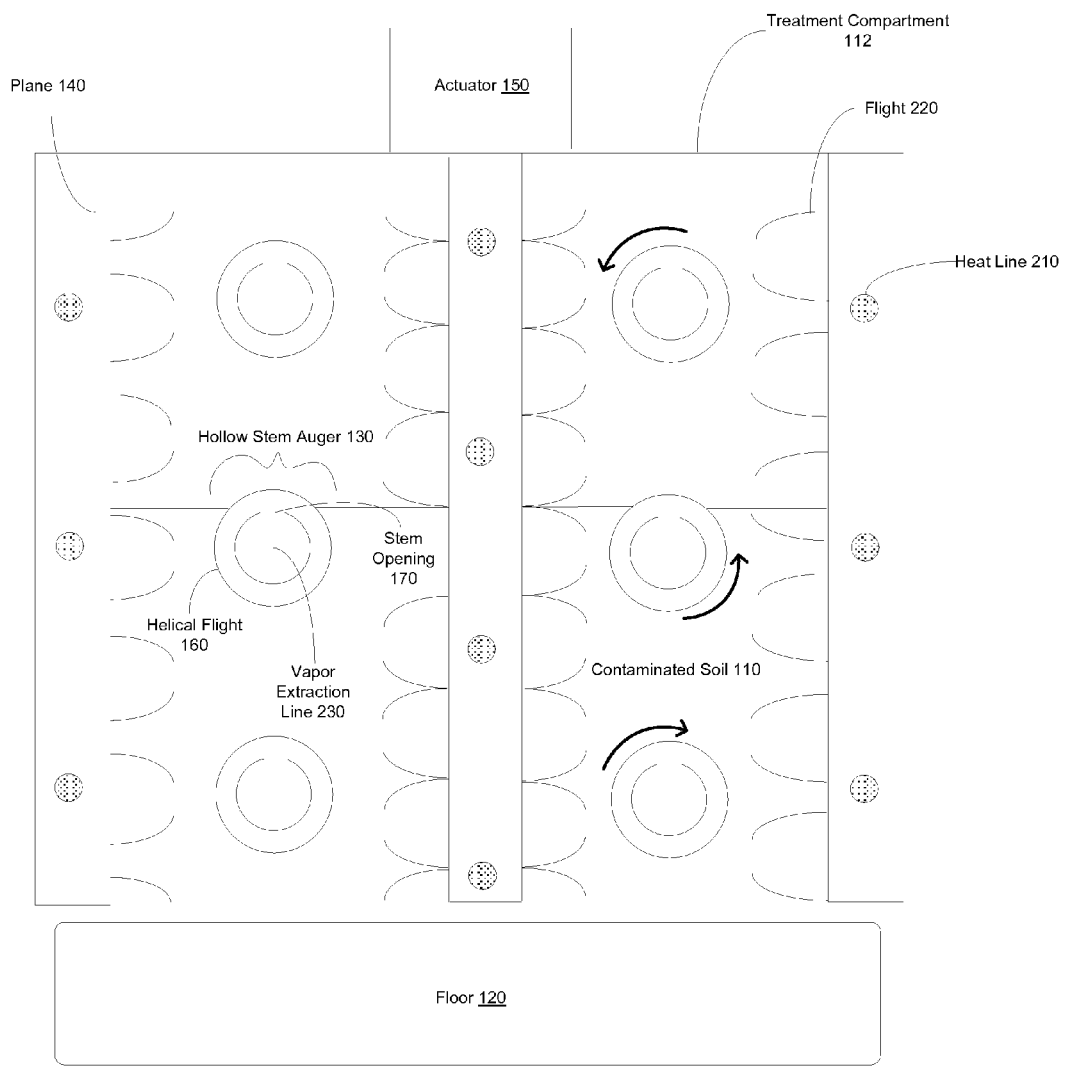
FIG. 2 is a cross section view from the rear of a treatment compartment of FIG. 1, according to one or more embodiment.

FIG. 2 is a cross section view from the rear of the treatment compartment 112 of FIG. 1, according to one or more embodiment.

Particularly, FIG. 2 introduces a heat line 210, flight 220 and a vapor extraction line 230.

The heat line 210 may provide heat to the plane 140 and flight 220 of the treatment compartment 112. Hot oil, water, and/or any other liquid or gas with high specific heat may be supplied to the heat line 210. An external heater, such as an external electric heater or natural gas heater may be used to heat the oil, water, and/or any other liquid or gas used to supply heat to the heat line 210. The oil, water, and/or any other liquid or gas may also be heated within the heat line 210 electrically. The electric heater may be an electrical equipment that converts electric current to heat by means of resistors that emit energy. The electric heater may use nichrome wire as the active element. The nichrome wire may be embedded within the heat line 210 and may be supported by heat resistant, refractory, electrically insulating ceramic.

In one or more embodiment heat transfer from the heat line 220 to the contaminated soil 110 may desorb hydrocarbon contaminates from the contaminated soil 110. Flight 220 may be used to directly transfer heat from the heat line 220 to the contaminated soil 110, and to facilitate mixing and loosening of the contaminated soil 110 through vibrations emanating from the actuator 150 of the plane 140. A tip of the flight 220 may be flexible due to its structure being narrower at its tip than at its based that is coupled to the hollow stem auger 130. This configuration of the flight 220 may allow the flight 220 to vibrate with greater amplitude and in a whip-like motion, similar to a fishing rod, and may further facilitate mixing and loosening of the contaminated soil 110.

The mixing and loosening of the contaminated soil 110 may create uniform vapor pathways around the surface and within the contaminated soil 110. The vapor pathways formed may allow for uniform heating of the contaminated soil 110 and uniform extraction of the resultant gas of the desorption process through the uniform vapor pathways, namely the post-treatment gas 180. Additionally, the formation of the uniform vapor pathways may increase surface area of the contaminated soil 110, which may allow for more efficient heating of the contaminated soil 110.

The contaminates from the contaminated soil 110 may be suctioned out of the treatment compartment 112 through the stem opening 170 of the hollow stem auger 130. The stem opening 170 may be coupled to the vapor extraction line 230, located at the core of the hollow stem auger 130. The vapor extraction line 230 may be a channel (e.g., a pipe or a tube) that permits intake and flow of post-treatment gas 180. Post-treatment gas 180 may comprise condensable hydrocarbon contaminates and/or non-condensable hydrocarbon contaminates. The vapor extraction line 230 may be coupled to the conduit to expel the post-treatment gas 180 out of the treatment chamber 112. The post-treatment gas 180 may be further processed in the reclamation system.

In one or more embodiment, the hollow stem auger 130 within the treatment compartment 112 may rotate to facilitated mixing and loosening of the contaminated soil 110. The rotating of the hollow stem auger 130 may be adjustable. The rotation may be adjusted between 0 revolutions per minute (rpm) and 120 rpm. A high rotation speed setting may be desirable for the batch of contaminated soil 110 that is desiccated and/or difficult to break up. The higher rotation speed setting for the hollow stem auger 130 may also be used in the shorter treatment compartment 112 to sufficiently mix and loosen the contaminated soil 110 before it reaches the far end of the inner length of the treatment compartment 112. A lower rotation speed setting for the hollow stem auger 130 may be used in the longer treatment compartment 112 to more thoroughly mix and loosen the contaminated soil 110. In addition, the rotation of the hollow stem auger 130 may be adjusted to rotate in a clockwise direction or in a counterclockwise direction. If more than one hollow stem auger 130 is used, each hollow stem auger 130 may be independently controlled to vary speed and/or direction of rotation. The speed and/or direction of rotation the hollow stem auger 130 may be adjustable through an electronic controller, such as the programmable logic controller (PLC) communicatively coupled to the motor of the hollow stem auger 130.

Figure 3:
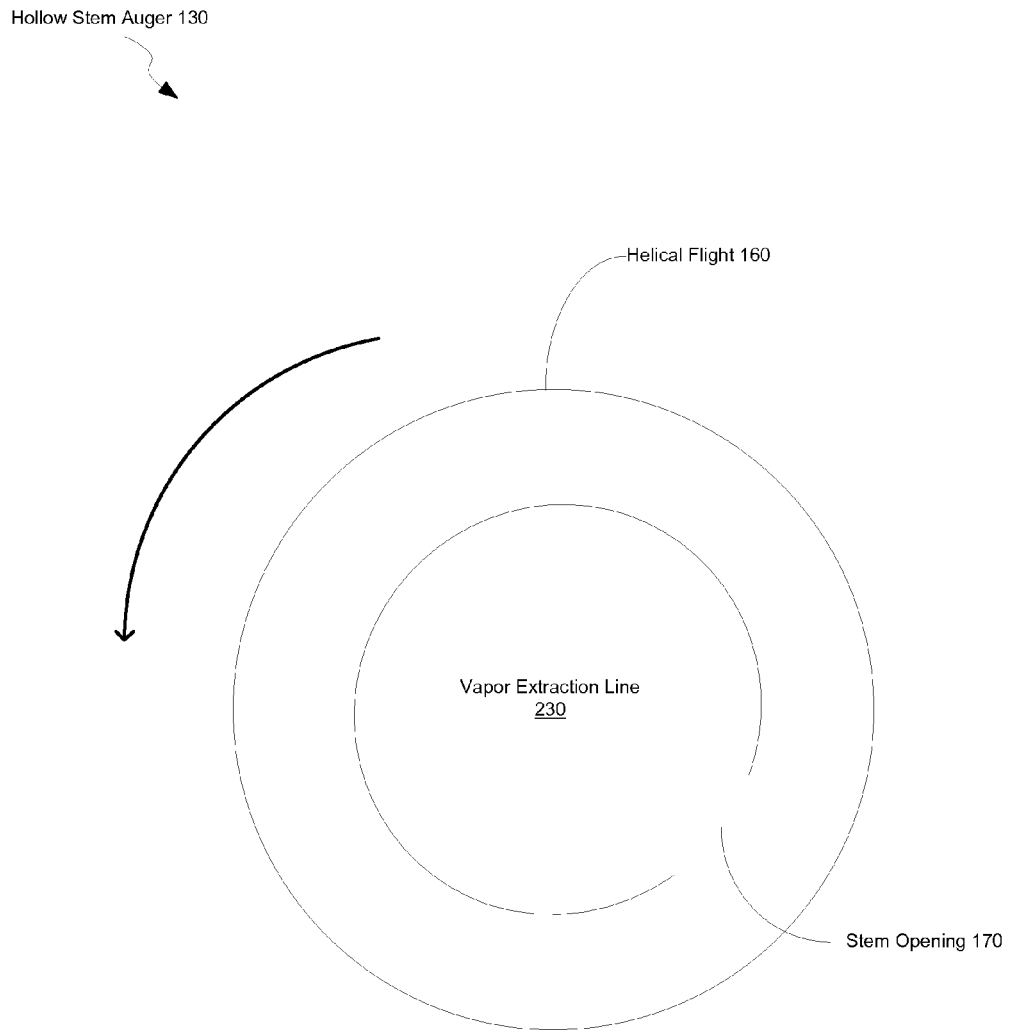
FIG. 3 is a cross section view of a hollow stem auger of FIG. 1, according to one or more embodiment.

FIG. 3 is a cross section view of the hollow stem auger 130 of FIG. 1, according to one or more embodiment.

In one or more embodiment, the hollow stem auger 130 comprising helical flight 160 may rotate to facilitated mixing and loosening of the contaminated soil 110. The rotating of the hollow stem auger 130 may be adjustable. The helical flight 160 may be in direct contact with the contaminated soil 110. The helical flight 160 may be a screw blade attached to the outer circumference of the hollow stem auger 130. The hollow stem auger 130 may be a steel rod. The helical flight 160 may comprise a sharp edge at the outer edge of the helical flight 160. The sharp edge of the helical flight 160 may help break apart clumps of contaminated soil 110. A length of the blade of the helical flight 160 may be defined as a distance measured from an outer circumference of the vapor extraction line 230, where the blade begins, to an outer edge of the helical flight 160. The length of the blade of the helical flight 160 may be 1 inch to 12 inches, such as e.g., 6 inches or 8 inches. A longer length of the helical flight 160 may be desirable for larger batches of contaminated soil 110 and/or to accommodate a larger treatment compartment 112. A shorter length of the helical flight 160 may be desirable for smaller batches of contaminated soil 110 and/or to accommodate a small treatment compartment 112.

The distance from the sharp edge of the helical flight 160 to an edge of the flight 220 of FIG. 2 may be between 1 inch and 20 inches. The helical flight 160 may be positioned in a manner that does not permit direct contact with the flight 220. A sufficient clearance distance may be desirable between the sharp edge of the helical flight 160 and the edge of the flight 220 to minimize or eliminate pre-mature wear and tear of the helical flight 160 and/or the flight 220. This sufficient distance may be a distance of at least 1 inch, such as e.g., 2 inches or 6 inches. A clearance distance of less than 1 inch may bend, break, and/or induce accelerated wear and tear on the helical flight 160 and/or flight 220 because although the helical flight 160 and flight 220 may not be in direct contact, dense soil and/or large rocks within the contaminated soil 110 combined with the rotation of the helical flight 160 and/or vibration of the flight 220 may not permit enough buffer movements of the helical flight 160 and/or flight 220 to reduce physical stress, thereby bending, breaking, and/or inducing accelerated wear and tear on the helical flight 160 and/or flight 220.

FIGS. 4A-4C are views showing alternative configurations for stem opening 170 of the hollow stem auger 130, according to one or more embodiment.

In one or more embodiment, the hollow stem auger 130 mixes and loosens contaminated soil 110 within the treatment compartment 112. After contaminates within the contaminated soil 110 desorbs from heat input from heat line 210, the stem opening 170 coupled to the vapor extraction line 230 of the hollow stem auger 130 may suction the resultant gas, namely post-treatment gas 180 comprising condensable hydrocarbon contaminates and/or non-condensable hydrocarbon contaminates, out of the treatment compartment 112. The vapor extraction line 230 may be located at the core of the hollow stem auger 130. The vapor extraction line 230 may be configured to produce negative pressure sufficient to extract the post-treatment gas 180, while leaving behind solid particulates from the contaminated soil 110, through a gas extraction fan coupled to the vapor extract line 230. The vapor extraction line 230 may be coupled to the reclamation system to further process the post-treatment gas 180.

The stem opening 170 of the hollow stem auger 130 may comprise at least one slit opening and/or at least one hole opening positioned between the helical flight 160. There may be a protective mesh screen at the stem opening 170 to minimize or prevent solid particles, such as e.g., sand, from going through to the vapor extraction line 230. Depending on the soil type, contaminate type, moisture level of the contaminated soil 110, and etc., a particular type of stem opening 170 may be desirable. For instance, the one or more slit may provide a higher flow for the suctioning of the post-treatment gas 180 out of the treatment compartment 112 because the one or more slit may have a larger area of opening due to its elongated length than the one or more hole of the same width. However, a size of the stem opening 170 may be adjusted irrespective of whether it comprises one or more slit or one or more hole.

On the other hand, one or more hole may be desirable where contaminated soil 110 comprise smaller particulates. The one or more hole may operate similar to a drainage filter for a shower drain by keeping large and/or long particulars (e.g., hair in the shower configuration) from passing through. However, since the one or more hole may comprise a smaller area of opening compared to the one or more slit of similar width, flow may be restricted. Opening the holes larger to accommodate flow may not sufficiently filter out certain particles from the vapor extraction line 230.

Any number and size of slits and/or holes in any pattern and orientation may be deployed for the stem opening 170, depending on the soil type, contaminate type, moisture level, etc. of the contaminated soil 110. In addition, stem opening 170 may be in any shape (e.g. triangle, rectangle, straight line, etc.) and configuration (e.g. the straight line in between two holes, the triangle next to the rectangle, next to the square, and etc.) not limited to slits and/or holes.

Figure 5A:
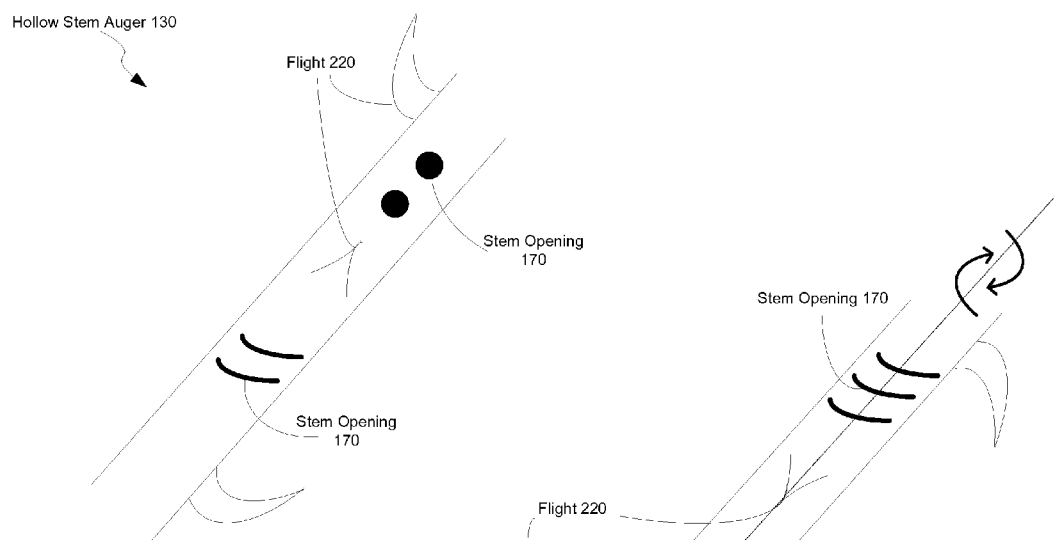
FIGS. 5A-5C are views showing alternative configurations of the hollow stem auger comprising the flight of a plane of FIG. 2, according to one or more embodiment.
Figure 5B:
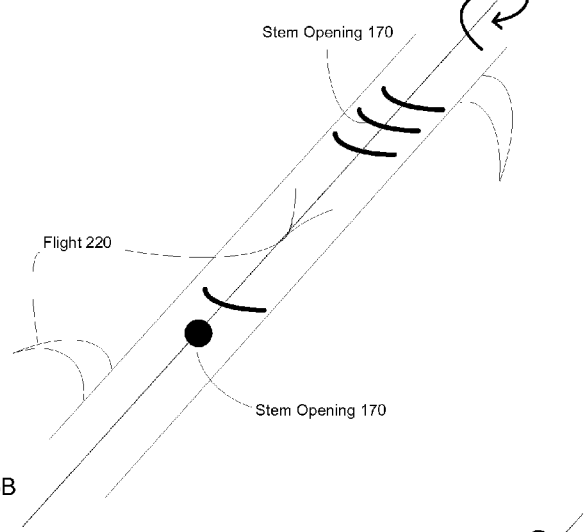
Figure 5C:
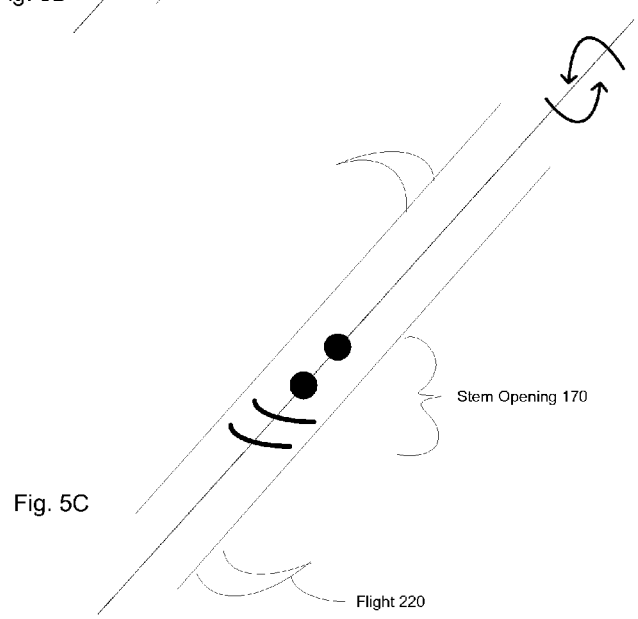

FIG. 5A-5C are views showing alternative configurations of the hollow stem auger 130 comprising flight 220 of the plane 140 of FIG. 2, according to one or more embodiment.

In one or more embodiment, the hollow stem auger 130 mixes and loosens contaminated soil 110 within the treatment compartment 112. After contaminates within the contaminated soil 110 desorbs from heat input from heat line 210, the stem opening 170 coupled to the vapor extraction line 230 of the hollow stem auger 130 may suction the resultant gas, namely post-treatment gas 180 comprising condensable hydrocarbon contaminates and/or non-condensable hydrocarbon contaminates, out of the treatment compartment 112. The vapor extraction line 230 may be located at the core of the hollow stem auger 130. The vapor extraction line 230 may be configured to deliver negative pressure sufficient to extract the post-treatment gas 180, while leaving behind solid particulates from the contaminated soil 110, through the gas extraction fan coupled to the vapor extract line 230. The vapor extraction line 230 may be coupled to the reclamation system to further process the post-treatment gas 180.

The hollow stem auger 130 may comprise flight 220 positioned between a plurality of slit opening 170 of the hollow stem auger 130. The flight 220 may be configured to point in a direction (e.g. upward, downward, leftward, rightward, and diagonally) as FIG. 5A, or it may be positioned to point in an opposite direction relative to FIG. 5A and as shown in FIG. 5B. A mixture of hollow stem auger 130 comprising both configurations seen in FIG. 5A and FIG. 5B may be deployed in the system when more than one hollow stem auger 130 is used. In addition, a single hollow stem auger 130 may comprise both configurations of the flight 220 seen in FIG. 5A and FIG. 5B, and as shown in FIG. 5C. A particular configuration of flight 220 may depend on a desirable direction of mixing and loosening of the contaminated soil 110. In general, the mixing and loosening of the contaminated soil 110 will follow the direction that the flight 220 is pointing towards. For example, if the flight 220 is pointing in a particular direction, the mixing and loosening of the contaminated soil 110 will have a narrower base at each contact area between the flight 220 and the contaminated soil 110, and may widen near or at a contact point between the tip of the flight 220 and the contaminated soil 110 due to vibrations of the tip. A particular direction of mixing and loosening of the contaminated soil 110 may be desirable depending on soil type, contaminate type, moisture level, and etc. Additionally, a mixed direction configuration such as in Figure C may permit a more entropic mixing and loosening of the contaminated soil 110.

The hollow stem auger 130 may employ flight 220 over helical flight 160 depending on the soil type, contaminate type, moisture level, etc. The flight 220 may be more flexible than helical flight 160, which may allow flight 220 to vibrate near or at its tip point. In comparison, helical flight 160 may be immovably fixed to the hollow stem auger 130 and may have limited freedom to vibrate compared to flight 220. The vibration from the flight 220 may facilitate mixing and loosening of the contaminated soil 110 in a similar fashion as where the flight 220 is coupled to the plane 140 described above. The vibration of the flight 220 may operate similar to the fishing rod, where its flexibility may permit its tip to sway in opposite directions with greater amplitude and in the whip-like motion.

FIG. 6A-6D are views showing alternative configurations for the flight 220 of the plane 140 of FIG. 2, according to one or more embodiment.

In one or more embodiments, the treatment compartment 112 may house the treatment of the contaminated soil 110 in the soil evaporative desorption process. The plane 140 may be a planar structure configured to shield the contaminated soil 110 from external noise (e.g. weather conditions). The plane 140 may be made from steel and may be insulated to minimize or prevent heat loss to the environment. The plane 140 may be configured to vibrate through the actuator 150. The vibration of the plane 140 may facilitate mixing and loosening of the contaminated soil 110, thereby creating uniform vapor pathways around and within the contaminated soil 110. The formed vapor pathways may allow for uniform heating of the contaminated soil 110 and uniform extraction of the result gas of the desorption process through the uniform vapor pathways, namely the post-treatment gas 180. Additionally, the formation of the uniform vapor pathways may increase surface-area-to-volume ratio of the contaminated soil 110, which may allow for more efficient heating of the contaminated soil 110.

The plane 140 may comprise flight 220 positioned within the treatment compartment 112 to enhance the mixing and loosening of the contaminated soil 110 as it moves through the inner length of the treatment compartment 112. The tip of the flight 220 may be flexible due to its structure being narrower at its tip than at its based, which is coupled to the plane 140. This configuration of the flight 220 may allow the flight 220 to vibrate with greater amplitude and in a whip-like motion, similar to a fishing rod, and may further facilitate mixing and loosening of the contaminated soil 110. The flight 220 may be configured to point in a direction (e.g. upward, downward, leftward, rightward, and/or diagonally) as shown in FIG. 6A, or it may be configured to point in an opposite direction relative to FIG. 6A as shown in FIG. 6B. A mixture of multiple plane 140 comprising both configurations seen in FIG. 6A and FIG. 6B may be deployed in the system. In addition, a single plane 140 may comprise both configurations of the flight 220 seen in FIG. 6A and FIG. 6B, as shown in FIG. 6C and FIG. 6D.

In FIG. 6C, a pair of flight 220 may be configured in a manner that permits their curved tips to be in close proximity. This configuration may be especially useful in breaking up desiccated clumps of contaminated soil 110 that may require more rigidity. The combined tips from the pair of flight 220 may provide the strength to break apart said contaminated soil 110. On the other hand, FIG. 6D is a configuration of a pair of flight 220 that may comprise of their bases being in close proximity with their curved tips pointing in opposite directions. This configuration may be especially useful for enhanced displacement of the contaminated soil 110 during mixing. The configuration of FIG. 6D may be used when maximal mixing of the contaminated soil 110 is required. In addition, a combination of pairs of flights 220 from FIG. 6C and FIG. 6D may be deployed on a single plane 140 for the benefit of both configurations.

Various patterns may also be used that mixes up each of the configuration from FIGS. 6A-6D such as, e.g. a flight configured in the positioned of FIG. 6A may be positioned next to two pairs of flight 220 in the configuration of FIG. 6C. Mixing and matching the various configurations of the flight 220 of the plane 140 may also mix the benefits of each configuration. For example, the configurations of FIG. 6C and FIG. 6D may be mixed together in a single plane 140 to acquire the benefit of being able to break apart desiccated, hardened chunks of contaminated soil 110 and to acquire the ability for maximal mixing of the contaminated soil 110 through the configuration of the pair of flight 220 in FIG. 6D. The vibration of the plane 140 comprising flight 220 may be adjustable through an electronic controller, such as the programmable logic controller (PLC) communicatively coupled to the actuator 150.

Figure 7:
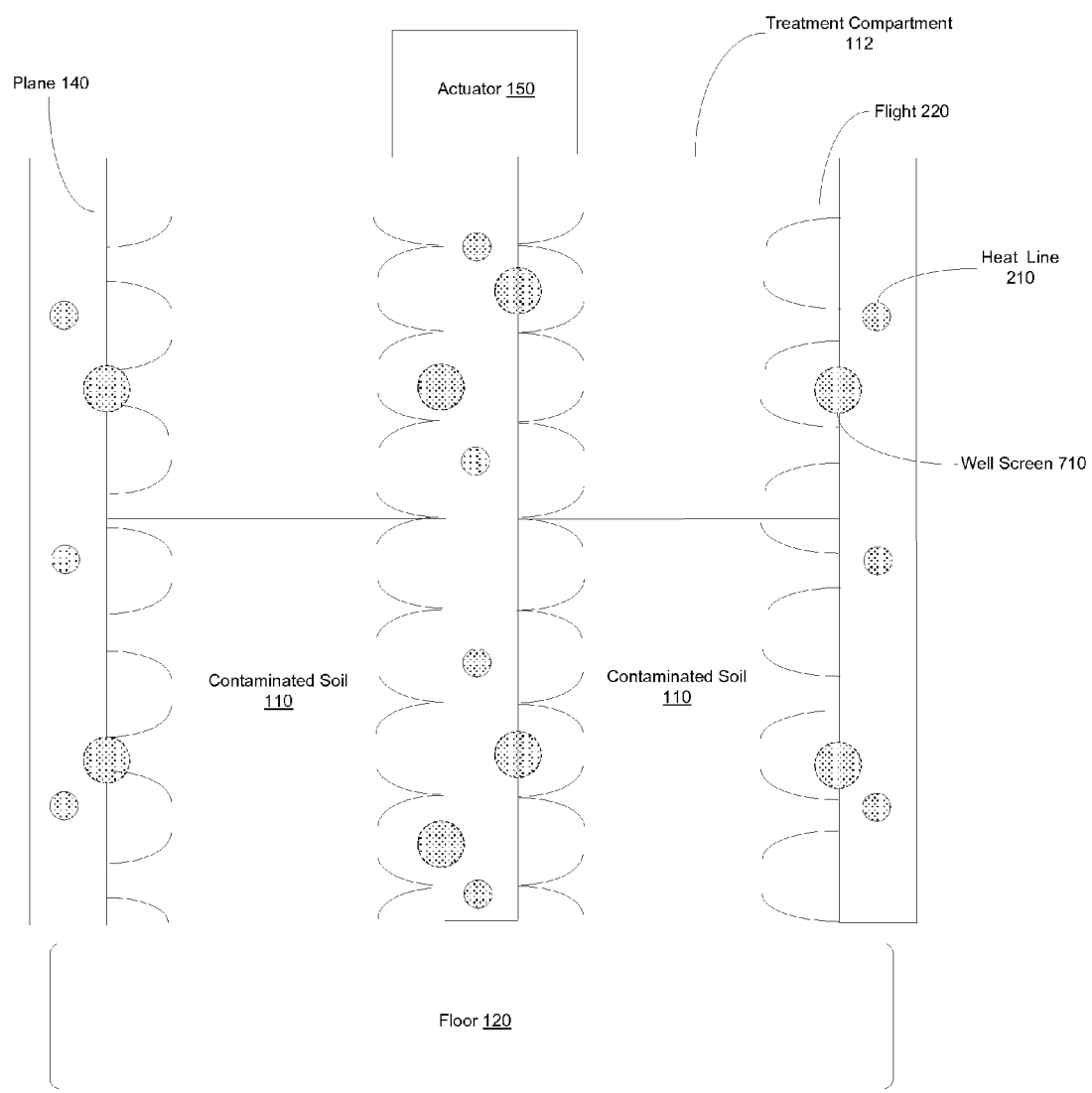
FIG. 7 is an alternative configuration for the cross section view from the rear of the treatment compartment of FIG. 2, according to one or more embodiment.

FIG. 7 is an alternative configuration for the cross section view from the rear of the treatment compartment 112 of FIG. 2, according to one or more embodiment.

Particularly, FIG. 7 introduces well screen 710.

In one or more embodiment, the treatment compartment 112 may comprise of plane 140, which are configured to vibrate through the actuator 150. The vibration of plane 140 may facilitate mixing and loosening of the contaminated soil 110, thereby creating uniform vapor pathways around and within the contaminated soil 110. The formed vapor pathways may allow for uniform heating of the contaminated soil 110 and uniform extraction of the resultant gas of the desorption process through the uniform vapor pathways, namely the post-treatment gas 180. Additionally, the formation of the uniform vapor pathways may increase surface-area-to-volume ratio of the contaminated soil 110, which may allow for more efficient heating of the contaminated soil 110.

Heat line 210 may be configured to delivery heat to the treatment compartment 112 to desorb contaminated soil 110 within the treatment compartment 112. The heat line 210 may be a channel that permits oil, water, and/or any other liquid or gas with high specific heat to flow through to deliver heat to the contaminated soil 110. The heat line 210 may be made from a high heat conductive material (e.g., steel).

The treatment compartment 112 may comprise well screen 710 on the inner surfaces of the plane 140. The well screen 710 may operate to suction the resultant gas from the desorption process on the contaminated soil 110, namely the post-treatment gas 180. The well screen 710 may be a cylindrical system of mesh screens and/or holes designed to permit post-treatment gas 180 to flow through. The well screen 710 may be coupled to the conduit configured to expel the post-treatment gas 180 out of the treatment chamber 112. The post-treatment gas 180 may be further processed in the reclamation system.

In one or more embodiment, the well screen 710 may also be configured to inject heated gas into the treatment compartment 112 from a heat source. The heated gas may desorb contaminates within the contaminates soil 110, which may then be suctioned out by the vapor extraction line 230 of the hollow stem auger 130 and/or the well screen 710.

Figure 8:
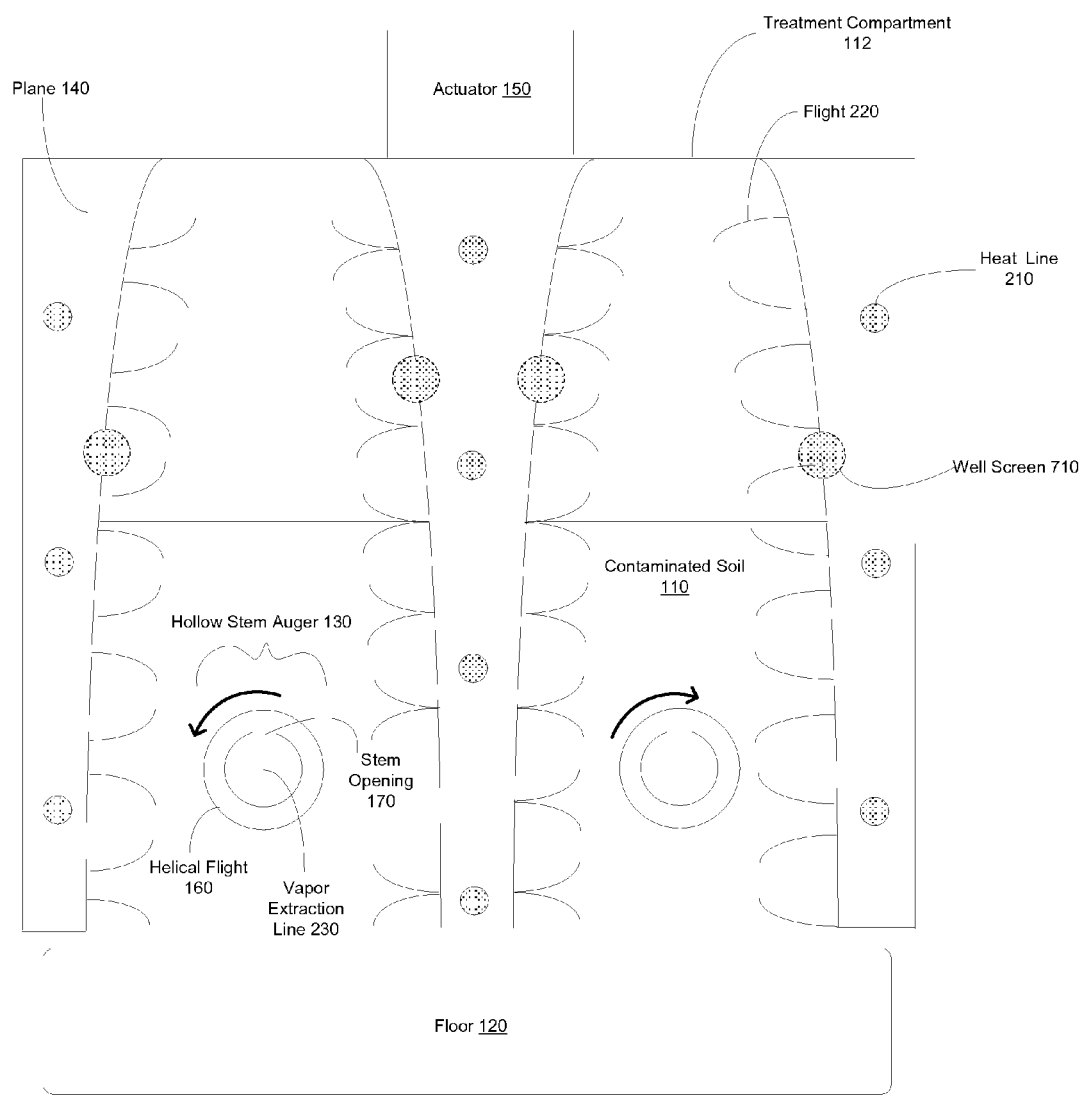
FIG. 8 is another alternative configuration for the cross section view from the rear of the treatment compartment of FIG. 2, according to one or more embodiment.

FIG. 8 is another alternative configuration for the cross section view from the rear of the treatment compartment 112 of FIG. 2, according to one or more embodiment.

In one or more embodiment, the treatment compartment 112 may comprise of plane 140, which are configured to vibrate through the actuator 150. The vibration of plane 140 may facilitate mixing and loosening of the contaminated soil 110, thereby creating uniform vapor pathways around and within the contaminated soil 110. The formed vapor pathways may allow for uniform heating of the contaminated soil 110 and uniform extraction of the resultant gas of the desorption process through the uniform vapor pathways, namely the post-treatment gas 180. Additionally, the formation of the uniform vapor pathways may increase surface-area-to-volume ratio of the contaminated soil 110, which may allow for more efficient heating of the contaminated soil 110.

Heat line 210 may be configured to delivery heat to the treatment compartment 112 to desorb contaminated soil 110 within the treatment compartment 112. The heat line 210 may be a channel that permits oil, water, and/or any other liquid or gas with high specific heat to flow through to deliver heat to the contaminated soil 110. The heat line 210 may be made from a high heat conductive material (e.g., steel).

The plane 140 may be configured in a manner such that its base, which may be coupled to a top surface of the treatment compartment 112, is wider than its tip, which may be located near the floor 120 and may be in contact with contaminated soil 110. This configuration wherein the tip of the plane 140 may be narrower than its base may permit the plane 140 to vibrate with greater amplitude and in the whip-like motion, thereby more thoroughly mixing and loosening the contaminated soil 110. The vibration of the plane 140 may be adjustable through an electronic controller, such as the programmable logic controller (PLC) communicatively coupled to the actuator 150.

In one or more embodiment, the hollow stem auger 130 may facilitate mixing and loosening of the contaminated soil 110 within the treatment compartment 112. The hollow stem auger 130 may comprise stem opening 170 configured to extract post-treatment gas 180 from the desorbed contaminated soil 110. The stem opening 170 may be coupled to the conduit to expel post-treatment gas 180 out of the treatment compartment 112. The post-treatment gas 185 may be further processed in the reclamation system that may comprise condensing condensable hydrocarbon contaminates extracted from the contaminated soil 110. The reclamation process may further comprise using non-condensed condensable hydrocarbon contaminates and/or non-condensable hydrocarbon contaminates to heat fresh air that may be supplied to the treatment compartment 112 as treatment gas.

The treatment compartment 112 may also comprise well screen 710 in addition to the hollow stem auger 130. The well screen 710 may facilitate the extraction of post-treatment gas 180 from the treatment compartment 112. The well screen 710 may be coupled to the conduit to expel post-treatment gas 180 from treatment compartment 112 into the reclamation system that may comprise condensing condensable hydrocarbon contaminates extracted from the contaminated soil 110. The reclamation process may further comprise using non-condensed condensable hydrocarbon contaminates and/or non-condensable hydrocarbon contaminates to heat fresh air that may be supplied to the treatment compartment 112 as treatment gas.

In one or more embodiment, the well screen 710 may also be configured to inject heated gas into the treatment compartment 112 from a heat source. The heated gas may desorb contaminates within the contaminates soil 110, which may then be suctioned out by the vapor extraction line 230 of the hollow stem auger 130 and/or the well screen 710.

Figure 9:
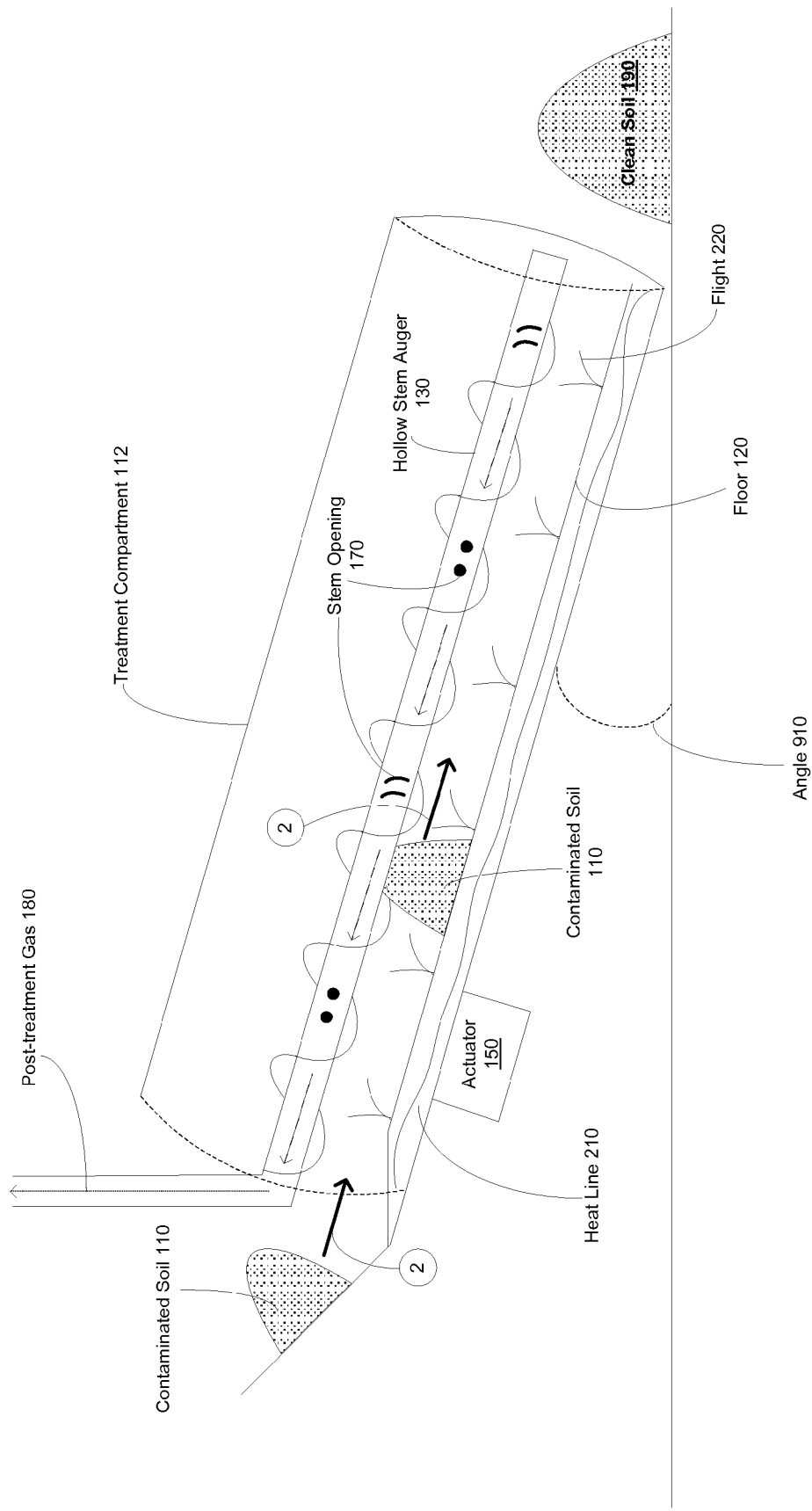
FIG. 9 is an overview of an alternative configuration for the soil evaporative desorption system, according to one or more embodiment.

FIG. 9 is an overview of an alternative configuration for the soil evaporative desorption system, according to one or more embodiment.

Particularly, FIG. 9 introduces an angle 910.

In one or more embodiment, the treatment compartment 112 may be a cylindrical tube-like structure that may comprise the floor 120. The floor 120 may comprise flight 220 and may be configured to vibrate through the actuator 150. An end of the floor 120 may be elevated a distance from a ground where the treatment compartment is situated. The evaluation of the floor 120 coupled with the vibration of the floor 120 may facilitate moving the contaminated soil 110 along the inner length of the treatment compartment 112. An angle of the elevation of the floor 120 may be adjustable. The adjustable angle of the elevation of the floor 120 may be between 0 degrees and 70 degrees such as, e.g. 30 degrees or 45 degrees. The angle of the elevation of the floor may be 70 degrees or less to sufficiently move the contaminated soil 110 across the inner length of the floor at a desirable velocity. An angle of elevation of the floor 120 above 70 degrees may move the contaminated soil 110 across the inner length of the floor 120 too quickly and may not subject the contaminated soil 110 to enough treatment time to completely desorb.

The vibration frequency of the floor 120 may be adjustable. The adjustable vibration frequency of the floor 120 may be between 0 Hz and 80 Hz such as, e.g. 40 Hz or 60 Hz. A higher vibration frequency may move the contaminated soil 110 across the elevated floor 120 at a higher velocity than a lower vibration frequency. Various vibration frequencies may be desirable depending on the angle of elevation of the floor 120. For example, if the contaminated oil 110 is moving across the elevated floor 120 too slow, then a higher vibration frequency of the floor 120 may be desirable to speed up the moving of the contaminated soil 110 across the elevated floor 120. The opposite may also be true, where a lower vibration frequency of the floor 120 may be desirable to slow down the moving of the contaminated soil 110 across the elevated floor 120.

In addition, the vibration of the floor 120 comprising flight 220 may facilitate mixing and loosening of the contaminated soil 110, thereby creating uniform vapor pathways around and within the contaminated soil 110. The formed vapor pathways may allow for uniform heating of the contaminated soil 110 and uniform extraction of the resultant gas of the desorption process through the uniform vapor pathways, namely the post-treatment gas 180. Additionally, the formation of the uniform vapor pathways may increase surface-area-to-volume ratio of the contaminated soil 110, which may allow for more efficient heating of the contaminated soil 110. The vibration of the floor 120 may be adjustable through an electronic controller, such as the programmable logic controller (PLC) communicatively coupled to the actuator 150

In one or more embodiment, the hollow stem auger 130 and/or the heat line 210 may be positioned along the inner length of the treatment compartment 112, and may be parallel to the floor 120. The heat line 210 may provide heat to the contaminated soil 110. Hot oil, water, and/or any other liquid or gas with high specific heat may be supplied to the heat line 210. An external heater, such as an electric heater or natural gas heater may be used to heat the oil, water, and/or any other liquid or gas used to supply heat to the heat line 210. The oil, water, and/or any other liquid or gas may also be heated within the heat line 210 electrically. The electric heater may be an electrical equipment that converts electric current to heat by means of resistors that emit energy. The electric heater may use nichrome wire as the active element. The nichrome wire may be embedded within the heat line 210 and may be supported by heat resistant, refractory, electrically insulating ceramic.

The hollow stem auger 130 comprising helical flight 160 may rotate within the treatment compartment 112. The rotation of the hollow stem auger 130 may facilitate mixing and loosening of the contaminated soil 110. The rotating of the hollow stem auger 130 may be adjustable. The rotation may be adjusted between 0 revolutions per minute (rpm) and 120 rpm. A high rotation speed setting may be desirable for the batch of contaminated soil 110 that is desiccated and/or difficult to break up. The higher rotation speed setting for the hollow stem auger 130 may also be used in the shorter treatment compartment 112 to sufficiently mix and loosen the contaminated soil 110 before it reaches a far end of the inner length of the treatment compartment 112. A lower rotation speed setting for the hollow stem auger 130 may be used in the longer treatment compartment 112 to more thoroughly mix and loosen the contaminated soil 110. In addition, the rotation of the hollow stem auger 130 may be adjusted to rotate in a clockwise direction or in a counterclockwise direction. If more than one hollow stem auger 130 is used, each hollow stem auger 130 may be independently controlled to vary speed and/or direction of rotation. The speed and/or direction of rotation of the hollow stem auger 130 may be adjustable through an electronic controller, such as the programmable logic controller (PLC) communicatively coupled to the motor of the hollow stem auger 130.

In one or more embodiment, the hollow stem auger 130 may comprise the vapor extraction line 230. The vapor extraction line 230 may be coupled to the conduit to expel the post-treatment gas 180 out of the treatment chamber 112. The post-treatment gas 180 may be further processed in the reclamation system. Clean soil 190 may exit the treatment compartment 112 through an exit opening of the treatment compartment 112 located at a far end of the treatment compartment 112.

Figure 10:
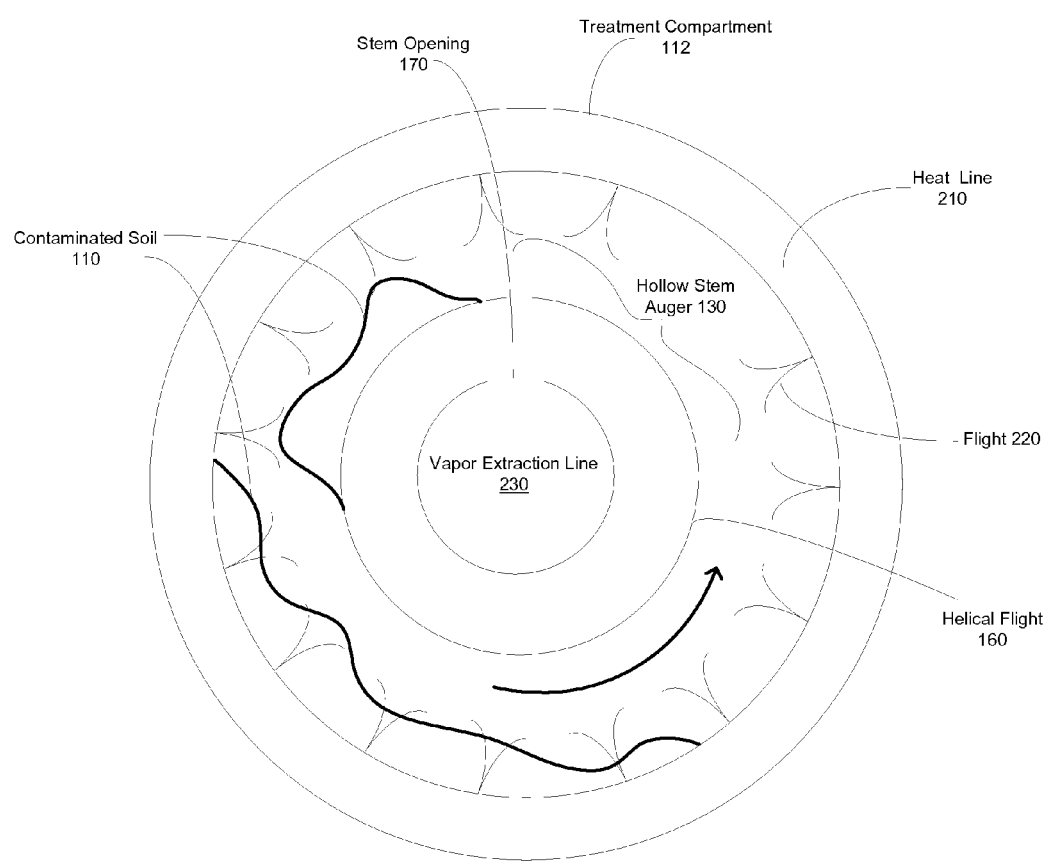
FIG. 10 is a cross section view of another alternative configuration for the soil evaporative desorption system, according to one or more embodiment.

FIG. 10 is a cross section view of another alternative configuration for the soil evaporative desorption system, according to one or more embodiment.

In one or more embodiment, the treatment compartment 112 may be a cylindrical tube-like structure comprising flight 220 arranged around an inner circumference of the treatment compartment 112. Multiple flight 220 may be positioned along the inner circumference of the treatment compartment 112. The hollow stem auger 130 may be arranged within a core of the treatment compartment. The hollow stem auger comprising helical flight 160 may rotate, thereby facilitate mixing and loosening of the contaminated soil 110.

The rotating of the hollow stem auger 130 may be adjustable. The rotation may be adjusted between 0 revolutions per minute (rpm) and 120 rpm. A high speed of rotation may be desirable for the batch of contaminated soil 110 that is desiccated and/or difficult to break up. In addition, the rotation of the hollow stem auger 130 may be adjusted to rotate in a clockwise direction or in a counterclockwise direction. The speed and/or direction of rotation of the hollow stem auger 130 may be adjustable through an electronic controller, such as a programmable logic controller (PLC) communicatively coupled to a motor of the hollow stem auger 130.

In one or more embodiment heat transfer from the heat line 220 to the contaminated soil 110 may desorb hydrocarbon contaminates from the contaminated soil 110. The heat line 210 may provide heat to the contaminated soil 110 within the treatment compartment 112. Hot oil, water, and/or any other liquid or gas with high specific heat may be supplied to the heat line 210. An external heater, such as the electric heater or natural gas heater may be used to heat the oil, water, and/or any other liquid or gas used to supply heat to the heat line 210. The oil, water, and/or any other liquid or gas may also be heated within the heat line 210 electrically. The electric heater may be an electrical equipment that converts electric current to heat by means of resistors that emit energy. The electric heater may use nichrome wire as the active element. The nichrome wire may be embedded within the heat line 210 and may be supported by heat resistant, refractory, electrically insulating ceramic.

Figure 11:
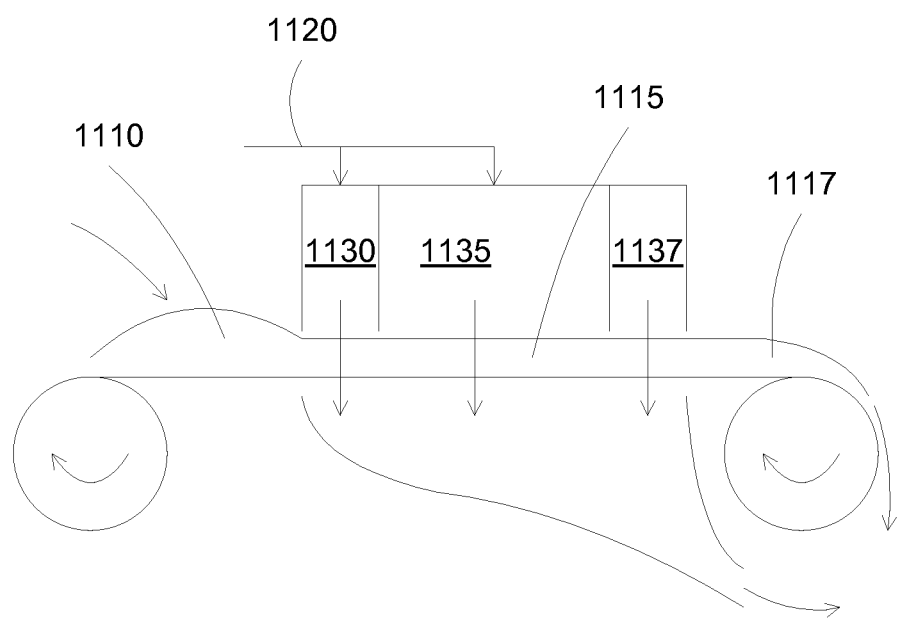
FIG. 11 illustrates a continuous conveyor system for thermally treating contaminated soil, according to one or more embodiment.

FIG. 11 illustrates a continuous conveyor system for thermally treating contaminated soil, according to one or more embodiment. A conveyor system, such as a belt driven system, can include a continuously running belt between multiple rollers. Contaminated soil 1110 can be loaded to one end of the conveyor. The conveyor can bring the soil 1110 to a treatment system, which can include a pre-treatment chamber 1130, a treatment chamber 1135, and a post-treatment chamber 1137. After being treated, the cleaned soil 1117 can be brought out of the conveyor.

The treatment system can have isolation door for reducing thermal heat loss. For example, the pre-treatment chamber 1130 and the post-treatment chamber 1137 can have a lower temperature than the treatment chamber, thus can isolate the thermal energy within the treatment chamber 1135. In addition, the treatment chambers can have small gap to the conveyor floor to limit the heat transfer to the outside. The small gap can be filled with the soil, e.g., acting to reduce the height of the soil that can enter the treatment chambers. For example, a pile of contaminated soil 1110 can be loaded to the front of the treatment chambers. The conveyor can carry the soil forward, however, the door gap can block the top portion of the soil, allowing only the bottom portion to be moved to the treatment chamber. The soil can thus act to seal the door gap, reducing heat loss. The door gap can be configured for efficient treatment, e.g., hot gas can heat the flat pile of soil 1115, releasing volatile contaminants to the bottom of the soil, e.g., through the conveyor floor.

Hot air 1120 can enter the treatment chambers, heating the soil to vaporize any volatile contaminants. The conveyor floor can have openings to allow the hot gas to escape, e.g., captured by an exhaust system for recycling the contaminants. The speed of the conveyor can be configured for a complete treatment of the flat pile of soil 1115. For example, if the treated soil 1117 is not completely treated, the speed of the conveyor can be reduced, allowing more treatment time in the treatment chamber 1135. In one or more embodiment, the conveyor can have a stop-and-go speed, ensuring that the soil is completely treated before bringing to the outside.

The soil treatment can be based on a thermal desorption process, accepting hot gas, such as air or other gases, to heat the soil to vaporize any volatile contaminants in the soil.

FIGS. 12A-12D illustrate a batch conveyor system for thermally treating contaminated soil, according to one or more embodiment. A platform 1250 can move to bring soil pile 1210 to the treatment chamber 1235. During treatment, the soil 1215 can be heated, for example, by heated gas 1220. Volatile contaminants can be removed through the floor of the platform 1250. After the treatment is completed, the platform continues to move, bringing the cleaned soil 1217 outward to be removed.

The platform can move continuously in one direction, accepting contaminated soil, bringing to the treatment chamber, and moving out to be removed. The contaminated soil is loaded to the same end of the platform, and the cleaned soil is removed at the other end.

Alternatively, the platform can move back and forth, alternating between soil loading and unloading. For example, after removing cleaned soil in one end of the platform, contaminated soil is then loaded to the same end. Thus the same soil can be loaded and unloaded at the same end of the platform, with the contaminated soil is brought to the treatment chamber after being loaded, and then the cleaned soil returns to the same end to be unloaded.

Figure 12A:
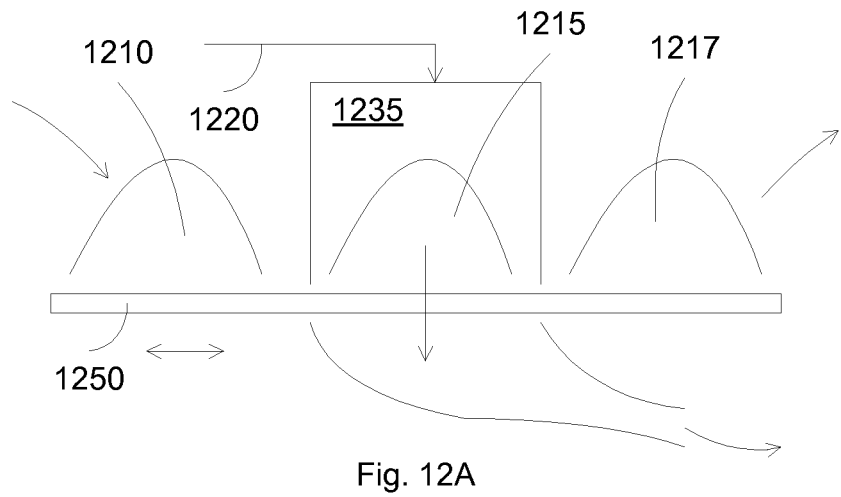
FIGS. 12A-12D illustrate a batch conveyor system for thermally treating contaminated soil, according to one or more embodiment.
Figures 12B, 12C:
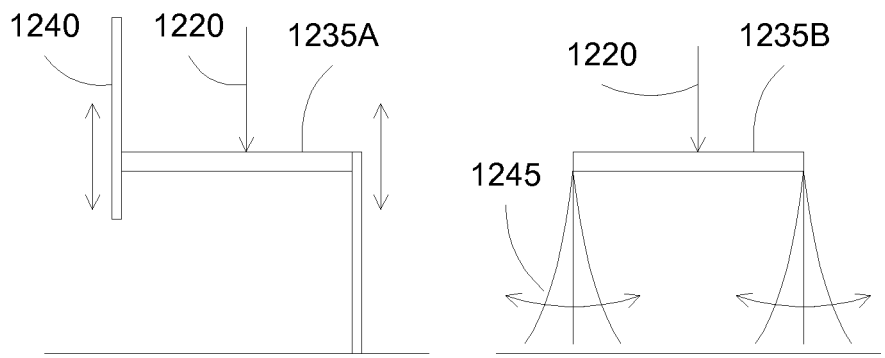

The treatment chamber can have doors to isolate the heated environment. In FIG. 12B, sliding doors 240 can be used to allow access to the treatment chamber 1235A. In FIG. 12C, flexible doors 1245 can be used to allow access to the treatment chamber 1235B. The flexible doors can include flexible curtain, for example, having one or more flexible strips to allow soil to pass through, while providing isolation to the outside environment.

Figure 12D:
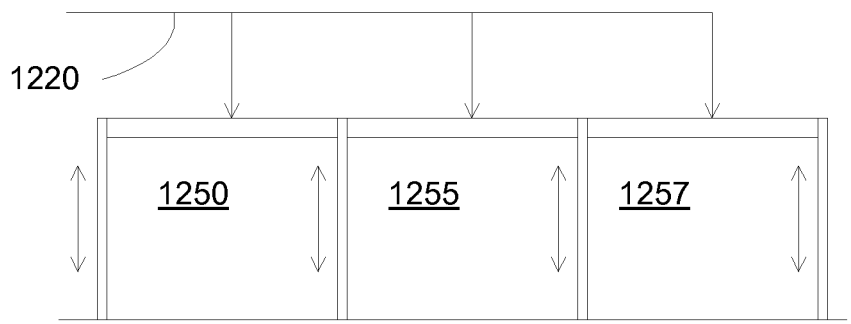
Figure 15A:
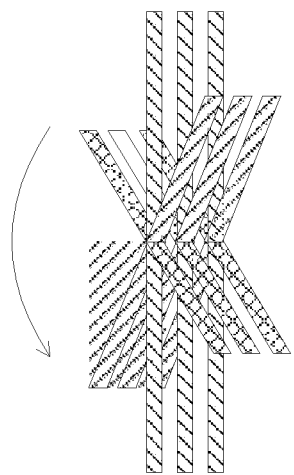
FIGS. 15A-15D illustrate various configurations for an agitation system, according to one or more embodiment.
Figure 15B:
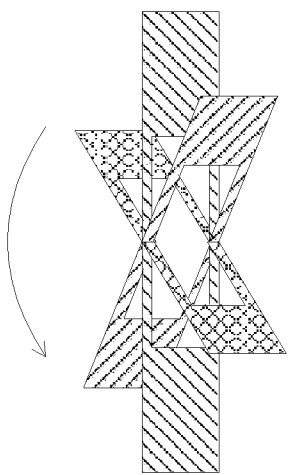
Figure 15C:
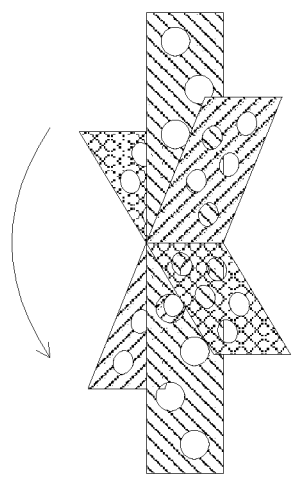
Figure 15D:
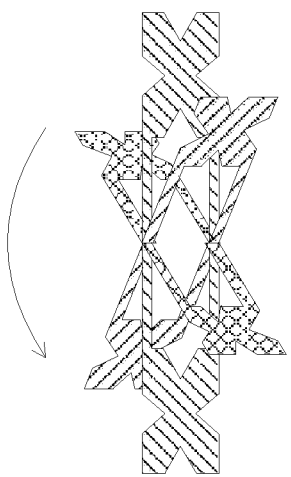

In one or more embodiment, the treatment chamber can include multiple chambers, such as pre-treatment chamber 1250, treatment chamber 1255, and post-treatment chamber 1257 (FIG. 12D). The pre- and post-treatment chambers can be used to provide better thermal insulation, together with improving throughput.

FIGS. 13A-13C illustrate another batch conveyor system for thermally treating contaminated soil, according to one or more embodiment. A platform 1350 can move to bring soil pile 1310 to the treatment chamber 1335. During treatment, the soil 1315 can be heated, for example, by heated gas 1320. Volatile contaminants can be removed through the floor of the platform 1350. After the treatment is completed, the platform moves backward, bringing the cleaned soil 1317 outward to be removed.

The platform can move back and forth, alternating between soil loading and unloading. For example, after removing cleaned soil in one end of the platform, contaminated soil is then loaded to the same end. Thus the same soil can be loaded and unloaded at the same end of the platform, with the contaminated soil is brought to the treatment chamber after being loaded, and then the cleaned soil returns to the same end to be unloaded.

The treatment chamber can have doors to isolate the heated environment. In FIG. 13B, sliding doors 1340 can be used to allow access to the treatment chamber 1335A. In FIG. 13C, flexible doors 1345 can be used to allow access to the treatment chamber 1335B. The flexible doors can include flexible curtain, for example, having one or more flexible strips to allow soil to pass through, while providing isolation to the outside environment.

In one or more embodiment, the treatment chamber can include multiple chambers, such as pre-treatment chamber, treatment chamber, and post-treatment chamber. The pre4 and post-treatment chambers can be used to provide better thermal insulation, together with improving throughput.

FIG. 14 illustrates an agitation system disposed in a soil box, according to one or more embodiment. A soil box 2120 can be configured to hold contaminated soil, and can be placed in a thermal treatment chamber. The thermal treatment chamber can accept hot gas, such as hot air, for heating the soil. When the soil is heated to a temperature that can vaporize the contaminants, the volatile contaminants can be removed from the soil box, for example, through the vapor extraction line 2110. A stirrer 2130 can be placed in the soil box for stirring the soil. For example, two stirrers can be positioned in two sides of the vapor extraction line 2110. The stirrers can include rotating paddles, with the axis of rotation coupled to the side of the soil box.

FIGS. 15A-15D illustrate various configurations for an agitation system, according to one or more embodiment. The agitation system can include multiple paddles coupled to a rotational axis. The paddles can have strips, end plates, openings or cut outs for ease of passing through the soil, while effectively stirring the soil. Other agitation configurations can also be used, such as paddle movements without a rotational axis, such as with a conveyor, or linear paddle movements.

Figure 16A:
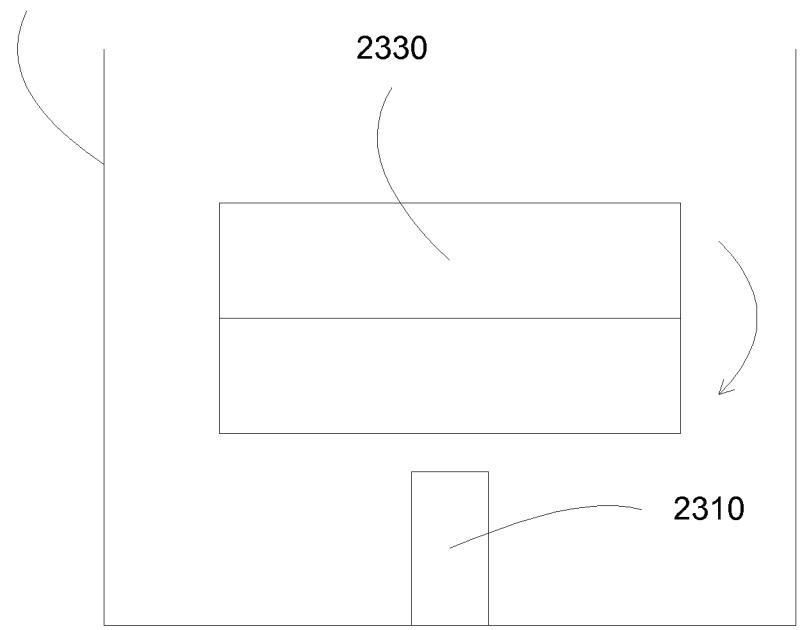
FIGS. 16A and 16B illustrate another agitation configurations, according to one or more embodiment.
Figure 16B:
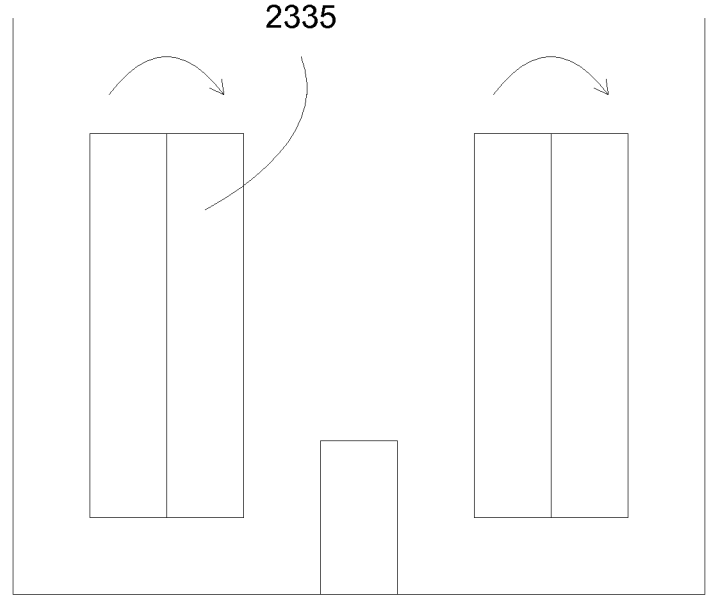

FIGS. 16A-16B illustrate another agitation configurations, according to one or more embodiment. A soil box 2320 can be configured to hold contaminated soil, and can be placed in a thermal treatment chamber. A vapor extraction line 2310 can be used to extract vaporized contaminants from the soil, after the soil being heated to a temperature that can vaporize the volatile contaminants. A stirrer 2330 can be placed in a same direction as the soil box floor, allowing stirring the soil in a planar surface direction. Multiple stirrers can be used for stirring a soil plane. Alternatively, one or more stirrers 2335 can form an angle, e.g., perpendicular, with the soil box floor.

In one or more embodiment, the soil box or treatment chamber can include movable a platform for agitating the soil. The moving platform can disturb the soil to allow a uniform and even heating.

Figure 17A:
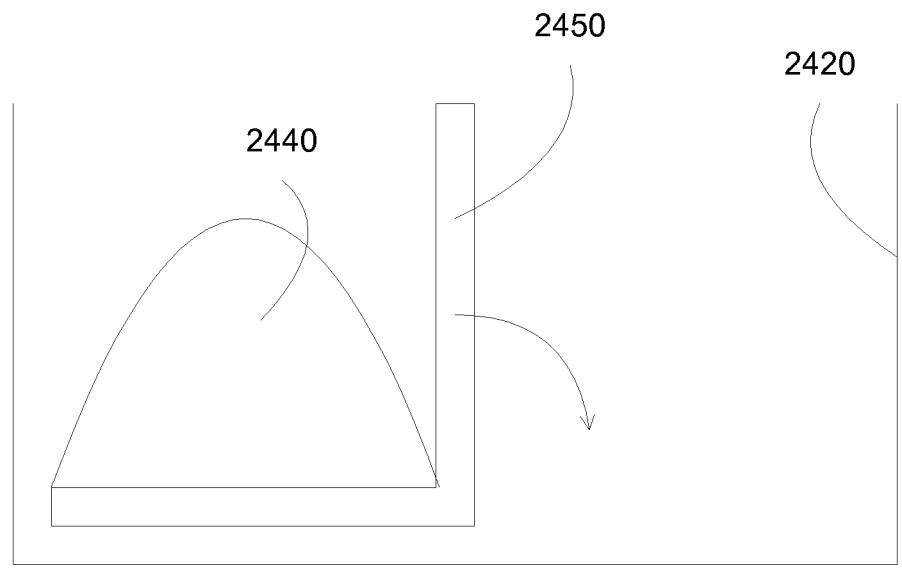
FIGS. 17A and 17B illustrate a rotating platform for agitating soil in a soil box, according to one or more embodiment.
Figure 17B:
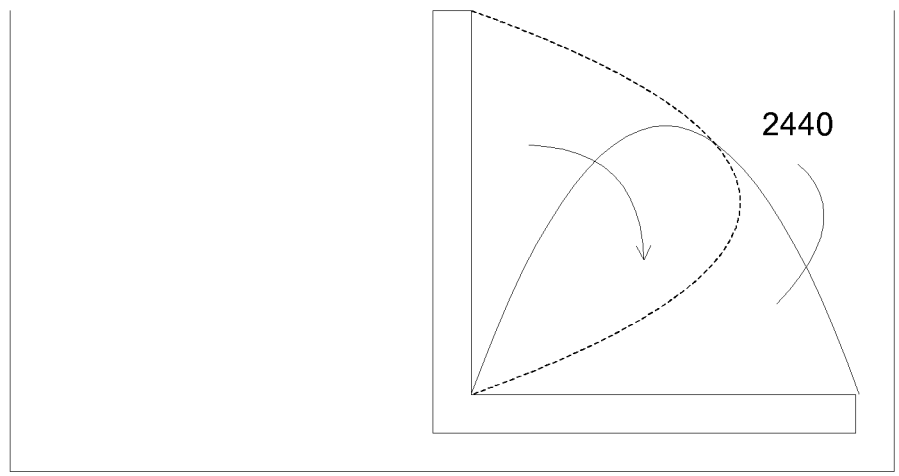

FIGS. 17A-17B illustrate a rotating platform for agitating soil in a soil box, according to one or more embodiment. A soil box 2420 can be configured to hold contaminated soil 2440, and can be placed in a thermal treatment chamber. Alternatively, the soil box can form a treatment chamber by sealing the inside volume. The contaminated soil can be placed on a platform 2450, which can rotate in the soil box 2420. The rotation can shift the soil from one side of the soil box to an opposite side, stirring the soil.

Figure 18A:
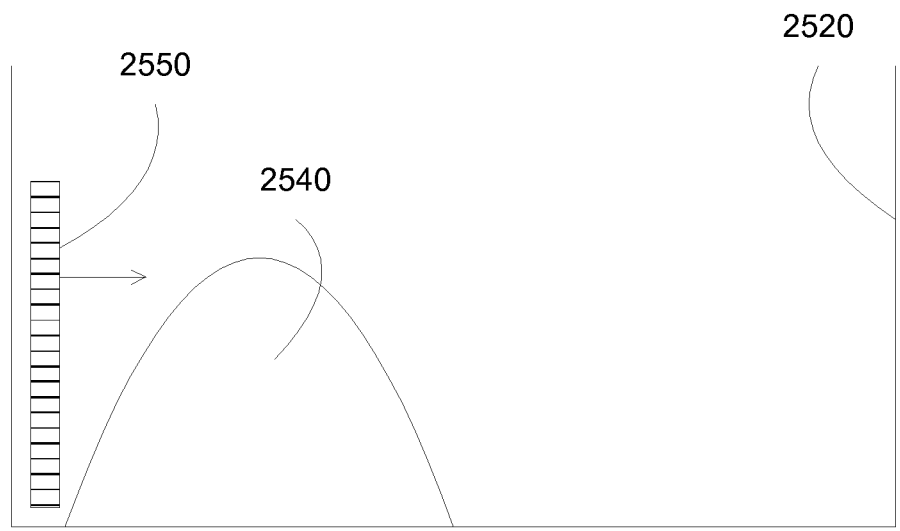
FIGS. 18A and 18B illustrate a translating platform for agitating soil in a soil box, according to one or more embodiment.
Figure 18B:
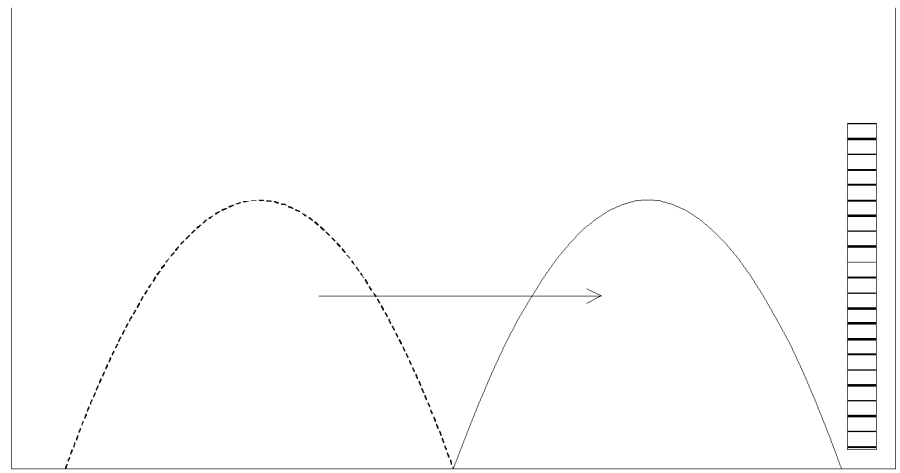

FIGS. 18A-18B illustrate a translating platform for agitating soil in a soil box, according to one or more embodiment. A soil box 2520 can be configured to hold contaminated soil 2540, and can be placed in a thermal treatment chamber. A platform 2550 can move from one side of the soil box to an opposite side. The movement of the platform 2550 can shift the soil from one side of the soil box to an opposite side, stirring the soil. The platform 2550 can have openings to allow soil to pass through, for example, the platform can be a screen, which is configured to move pass the soil while stirring the soil.

Figure 19:
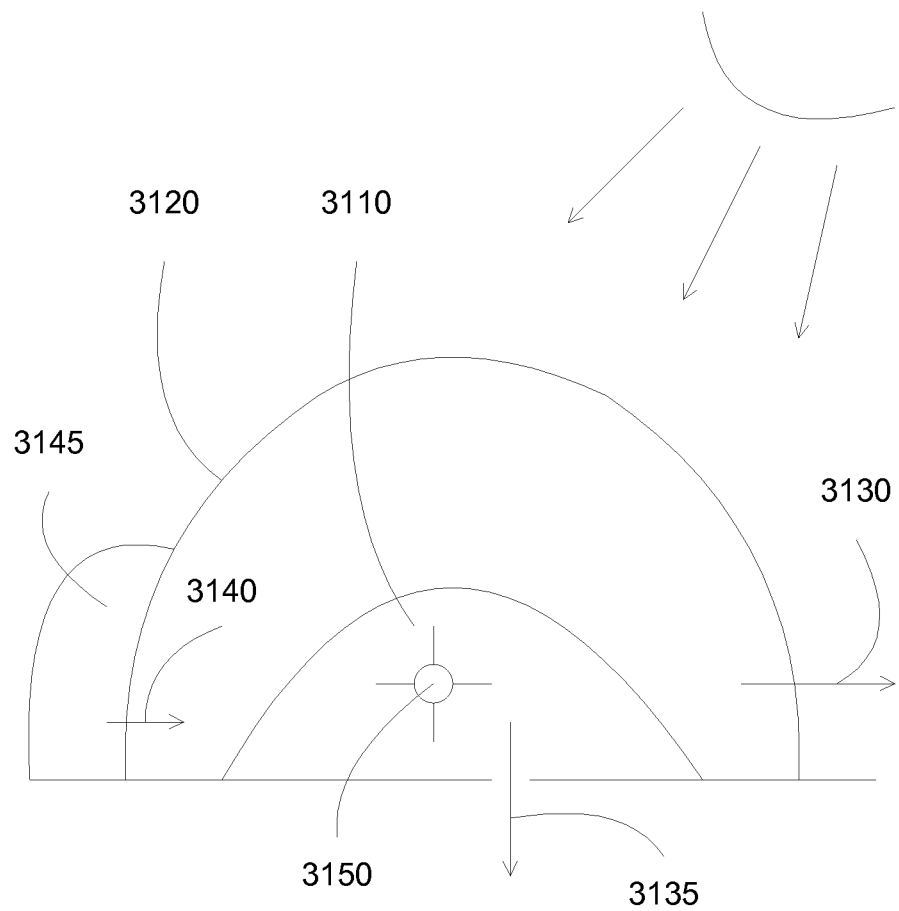
FIG. 19 illustrates a sun heating system for a thermal desorption process, according to one or more embodiment.

FIG. 19 illustrates a sun heating system for a thermal desorption process, according to one or more embodiment. A soil box 3120 can be configured to hold contaminated soil 3110, which can be placed on a floor. The soil box 3120 can be configured accept and retain thermal energy from the sun, for example, utilizing greenhouse effect to capture sunlight energy. The soil box 3120 can be made from transparent materials, such as glass or plastic. Under the sun exposure, the air within the soil box can be heated up, which can heat the soil 3110 to vaporize the volatile contaminants. The vaporized contaminants can be exhausted from the top surface 3130, or from the bottom of the soil 3135. Vapor extraction lines can be provided on the floor to extracting volatile contaminants, which can be more efficient than vapor extraction from to top surface.

In one or more embodiment, the soil box can accept an input gas 3140 to compensate for the exhaust gas. The input gas can be at room temperature, or can be preheated, for example, by a preheating chamber 3145 using the same greenhouse effect.

In one or more embodiment, an agitation system, such as a stirrer 3150, can be placed in the soil box for stirring the soil. The stirrers can include rotating paddles, with the axis of rotation coupled to the side of the soil box. The agitation system can include multiple paddles coupled to a rotational axis. The paddles can have strips, end plates, openings or cut outs for ease of passing through the soil, while effectively stirring the soil. Other agitation configurations can also be used, such as paddle movements without a rotational axis, such as with a conveyor, or linear paddle movements.

Figure 20:
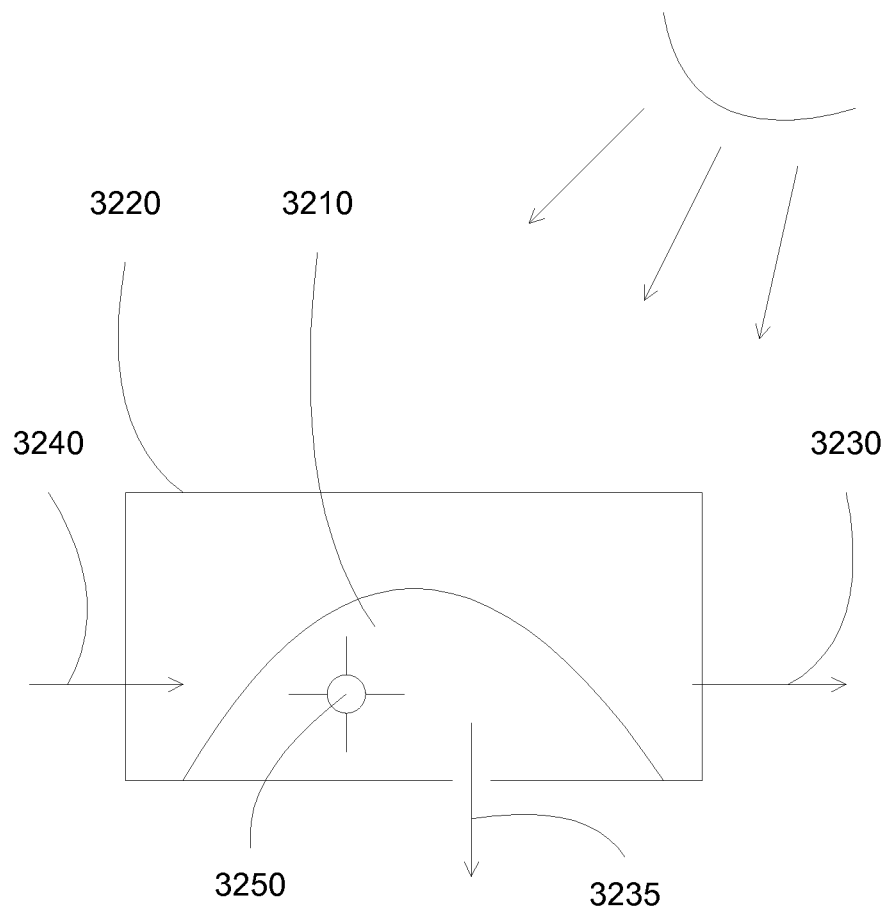
FIG. 20 illustrates another configuration for a sun heating system, according to one or more embodiment.

FIG. 20 illustrates another configuration for a sun heating system, according to one or more embodiment. A treatment chamber 3220 can be configured to hold contaminated soil 3210.

The treatment chamber 3220 can include a floor for supporting the soil, together with transparent surfaces to trap sunlight energy. For example, glass or plastic panels can be used to form the treatment chamber side and top walls. The transparent materials can be configured to withstand the high temperature process, e.g., can be up to 500 or 600 C for the thermal desorption process. Alternatively, the process temperature can be lower, e.g., up to about 300 C for low temperature thermal desorption processes.

Vapor extraction lines can be include for extracting vapor contaminants. The vapor extraction line can be configured for extracting 3230 contaminated vapor from the top surface of the soil, or can be configured for extracting 3235 contaminated vapor from the floor surface of the soil. An agitation system 3250 can be included for stirring the soil.

In one or more embodiment, the sun heating system can be a main heating source, for example, supplied gas 3240 can also be sunlight heated, e.g., through a preheating greenhouse chamber, before providing to the treatment chamber 3220.

In one or more embodiment, the sun heating system can be a supplemental heating source, for example, supplementing a hot gas supply 3240 that can be used for heating the soil. The sunlight heating system can reduce the energy consumption of the thermal desorption process for treating the contaminated soil.

Figure 21:
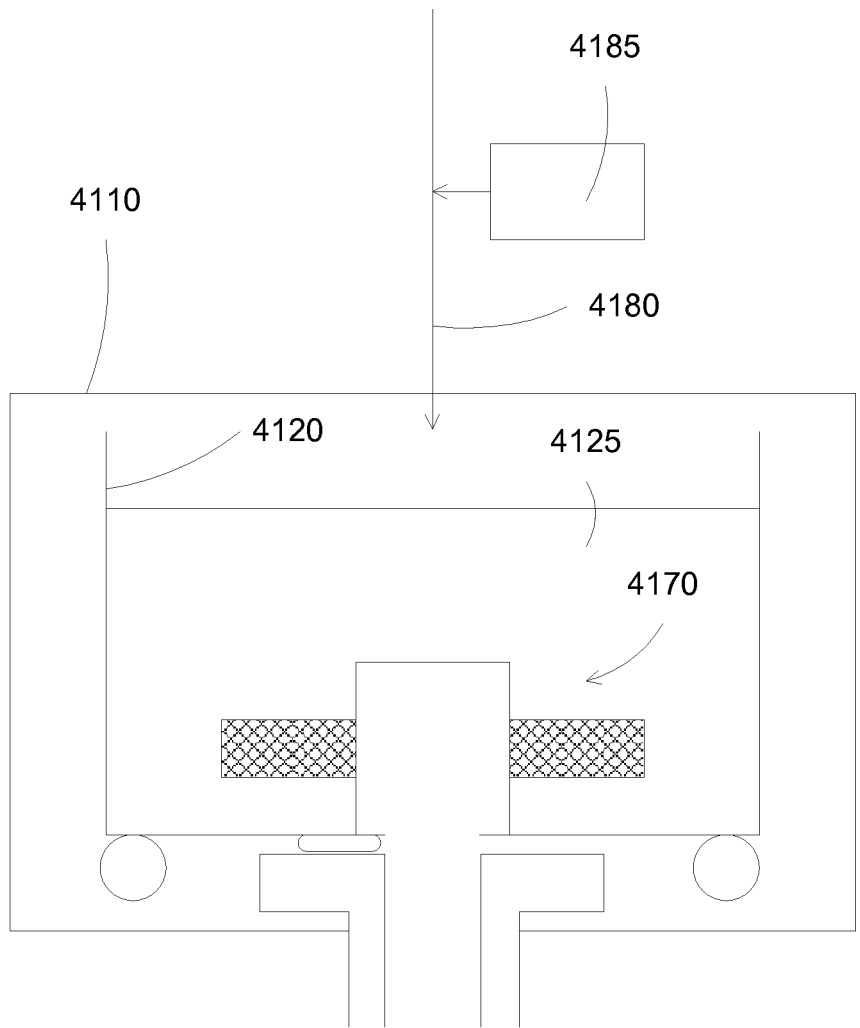
FIG. 21 illustrates a thermal desorption process with additives, according to one or more embodiment.

FIG. 21 illustrates a thermal desorption process with additives, according to one or more embodiment. A soil box 4120 can be configured to hold contaminated soil 4125, and can be placed in a treatment chamber 4110. A hot gas 4180 can be provided to the treatment chamber, for example, to heat the soil to vaporize the volatile contaminants. An additive reservoir 4185 can be coupled to the hot gas delivery path to supply additive, either in gaseous, vapor or liquid form. For example, for gaseous or vapor, reservoir 4185 can provide the gases or vapor directly to the flow stream of hot gas. The additives can be heated. For liquid, the reservoir can provide sprayed liquid, e.g., liquid in droplet form, to the flow stream, or the reservoir can accept the flow stream to bubble liquid to the flow stream.

Figure 22:
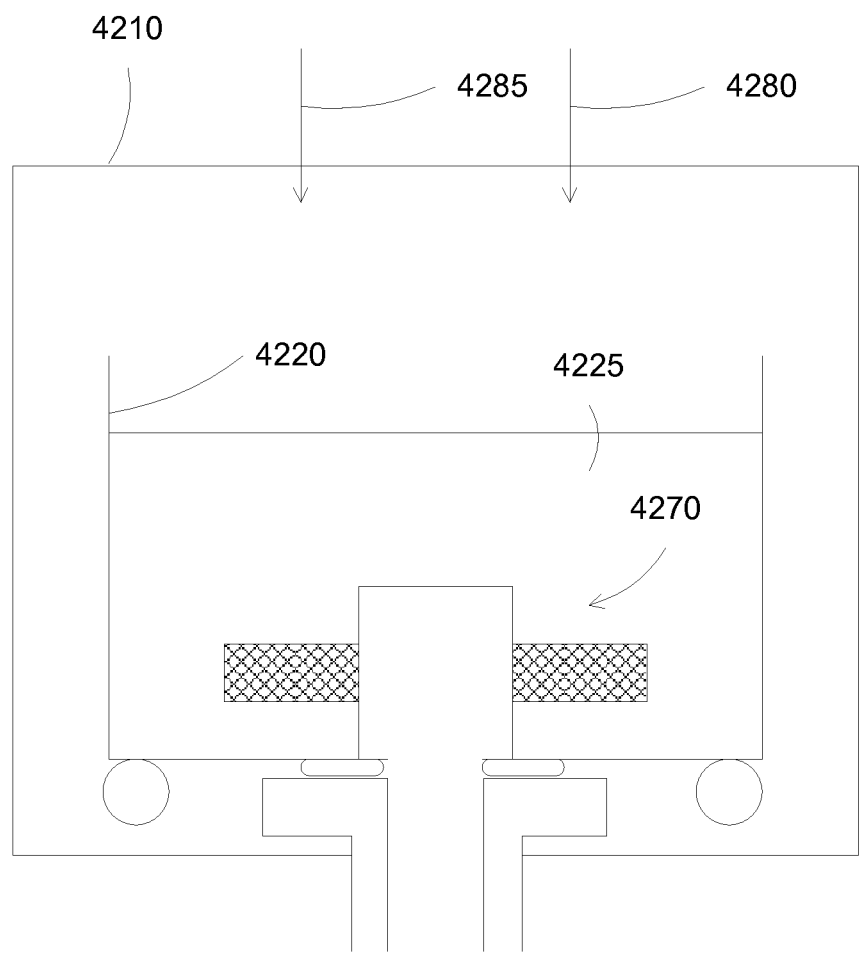
FIG. 22 illustrates another thermal desorption process with additives, according to one or more embodiment.

FIG. 22 illustrates another thermal desorption process with additives, according to one or more embodiment. A soil box 4220 can be configured to hold contaminated soil 4225, and can be placed in a treatment chamber 4210. A hot gas 4280 can be provided to the treatment chamber, for example, to heat the soil to vaporize the volatile contaminants. An additive flow stream 4285 can also be provided to supply additive, either in gaseous, vapor or liquid droplet form. For example, for gaseous or vapor, flow stream 285 can provide the gases or vapor directly to the treatment chamber, for example, in nozzle or in showerhead configuration. The additives can be heated. For liquid, the flow stream 4285 can provide sprayed liquid, e.g., liquid in droplet form, to the treatment chamber, or the flow stream can include carrier gas bubbling liquid additive to the treatment chamber.

Figure 23:
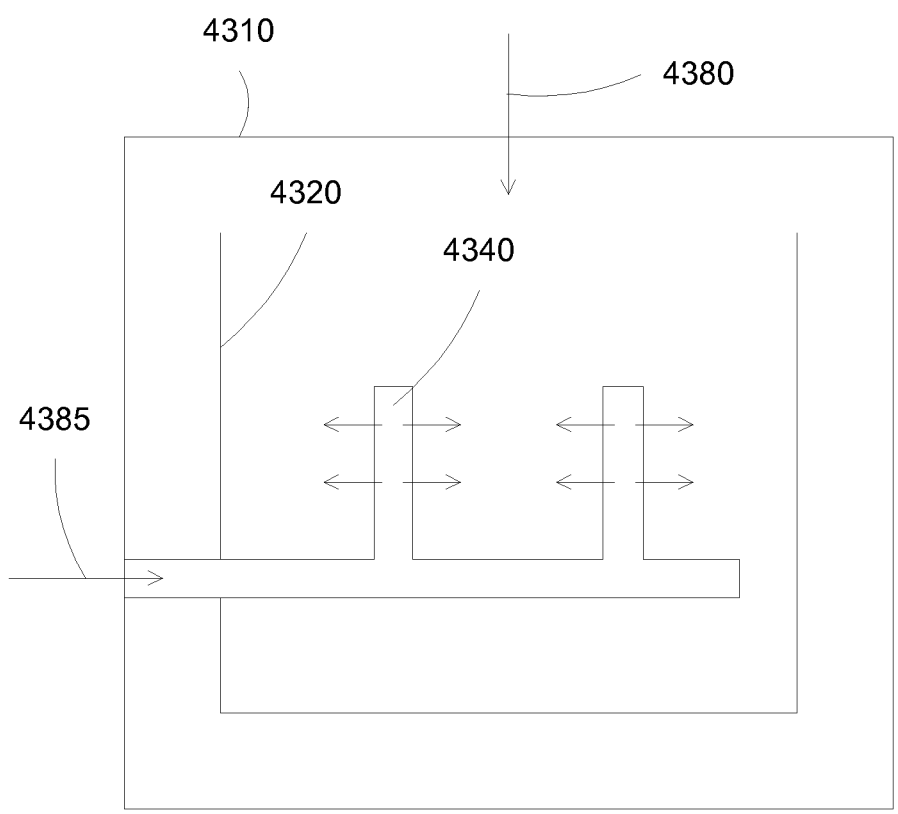
FIG. 23 illustrates yet another thermal desorption process with additives, according to one or more embodiment.

FIG. 23 illustrates yet another thermal desorption process with additives, according to one or more embodiment. A soil box 4320 can be configured to hold contaminated soil, and can be placed in a treatment chamber 4310. A hot gas 4380 can be provided to the treatment chamber, for example, to heat the soil to vaporize the volatile contaminants. An additive flow stream 4385 can also be provided to supply additive, either in gaseous, vapor or liquid droplet form. The additives can be heated. The additive delivery lines 4340 can be provided to the inside of the soil, processing the soil from the inside of the soil outward.

Other configurations for additive delivery can be used, such as a combination of any of the above configurations.

Other features of the present embodiments will be apparent from the accompanying drawings and from the detailed description that follows.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A thermal desorption soil remediation system, comprising:
  multiple structures wherein the structures comprise at least:
    a treatment compartment;
    a moving floor arranged to move a contaminated soil across an inner length of the treatment compartment, and wherein
    the moving floor is configured to vibrate, wherein the vibration creates uniform vapor pathways within the contaminated soil,
    at least one structure comprises a plurality of flights positioned in direct contact with the contaminated soil,
  at least one rod comprising a plurality of helical flights positioned within the inner length of the treatment compartment and configured to rotate,
  wherein the rotation of the at least one rod facilitates mixing of the contaminated soil;
  at least one oil line disposed within the treatment compartment configured to deliver heat to the contaminated soil;
  at least one vapor extraction line configured to extract vaporized volatile contaminates from the contaminated soil, and
  wherein the at least one vapor extraction line is positioned within a core of the at least one rod.

2. The system of claim 1, further comprising:
  wherein the moving floor is configured to move at least one of a forward direction and a backward direction,
  wherein the at least one of a forward direction and a backward direction is continuous,
  wherein a speed of the at least one of a forward direction and a backward direction is adjustable, and
  wherein the adjustable speed of the at least one of a forward direction and a backward direction is between 0 mph and 7 mph.

3. The system of claim 1, further comprising:
  wherein the at least one structure is coupled to the treatment compartment.

4. The system of claim 1, further comprising:
  wherein the at least one structure is coupled to the moving floor.

5. The system of claim 1, further comprising:
  wherein the vibration is adjustable, and
  wherein a vibration frequency of the adjustable vibration is between 0 Hz and 80 Hz.

6. The system of claim 1, further comprising:
  wherein a speed of the rotation is adjustable, and
  wherein the adjustable speed of the rotation is between 0 rpm and 80 rpm.

7. The system of claim 1, further comprising:
  wherein the at least one oil line is parallel to the at least one rod.

* * * * *